United States Patent [19]

Rosensteel, Jr. et al.

[11] Patent Number: 6,167,405

[45] Date of Patent: Dec. 26, 2000

[54] METHOD AND APPARATUS FOR AUTOMATICALLY POPULATING A DATA WAREHOUSE SYSTEM

[75] Inventors: Kenneth R. Rosensteel, Jr.; Jerry T Guhr; Joseph K. Picone, all of Phoenix, Ariz.

[73] Assignee: Bull HN Information Systems Inc., Billerica, Mass.

[21] Appl. No.: 09/067,101

[22] Filed: Apr. 27, 1998

[51] Int. Cl.[7] ................................................. G06F 17/30
[52] U.S. Cl. ........................................................... 707/102
[58] Field of Search ............................. 707/6, 101, 102; 395/785

[56] References Cited

U.S. PATENT DOCUMENTS

| | | | |
|---|---|---|---|
| 5,708,828 | 1/1998 | Coleman | 395/785 |
| 5,870,746 | 2/1999 | Knutson | 707/101 |
| 5,918,232 | 6/1999 | Pouschine et al. | 707/103 |

OTHER PUBLICATIONS

"Data Warehousing An Introduction", by Grayce Booth, Groupe Bull Technical Update, Man/Jun. 1995, pp. 1–9, Copyright Jun. 1995.

"The Distributed Data Warehouse Solution", by Kirk Mosher and Ken Rosensteel, Groupe Bull Technical Update, May/Jun. 1995, pp. 11–18 Copyright Jun. 1995.

"Bull Warehouse Initiative", by Wayne W. Eckerson, Oct. 1996, Patricia Seybold Group, pp. 1–28, Copyright 1996.

*Primary Examiner*—Wayne Amsbury
*Attorney, Agent, or Firm*—Faith F. Driscoll; John S. Solakian

[57] ABSTRACT

A method and system for facilitating the creation of warehouse requests in a data warehouse system. During the design of the data warehouse tables, a repository tool is used for storing a number of new objects such as source and target databases, source and target tables and warehouse requests that are graphically defined and linked together by an administrator with the repository tool. The resulting visual design is so drawn so as to serve as input for each warehouse request to be generated. The administrator invokes a data replication component that operatively couples to the repository tool signaling that the warehouse request is to be implemented. The data replication component automatically creates the different subcomponents of the request by accessing various links stored by the repository tool and displays a visual representation of the subcomponents and their relationships to each other to the administrator. Thereafter, the replication component provides access to menu screens for enabling the administrator to visualize each of the subcomponents of the request and their properties for enabling modifications to be made to such subcomponents for completing configuration of all request subcomponents. Subsequently, the warehouse request can be scheduled to execute and populate the warehouse tables.

35 Claims, 13 Drawing Sheets

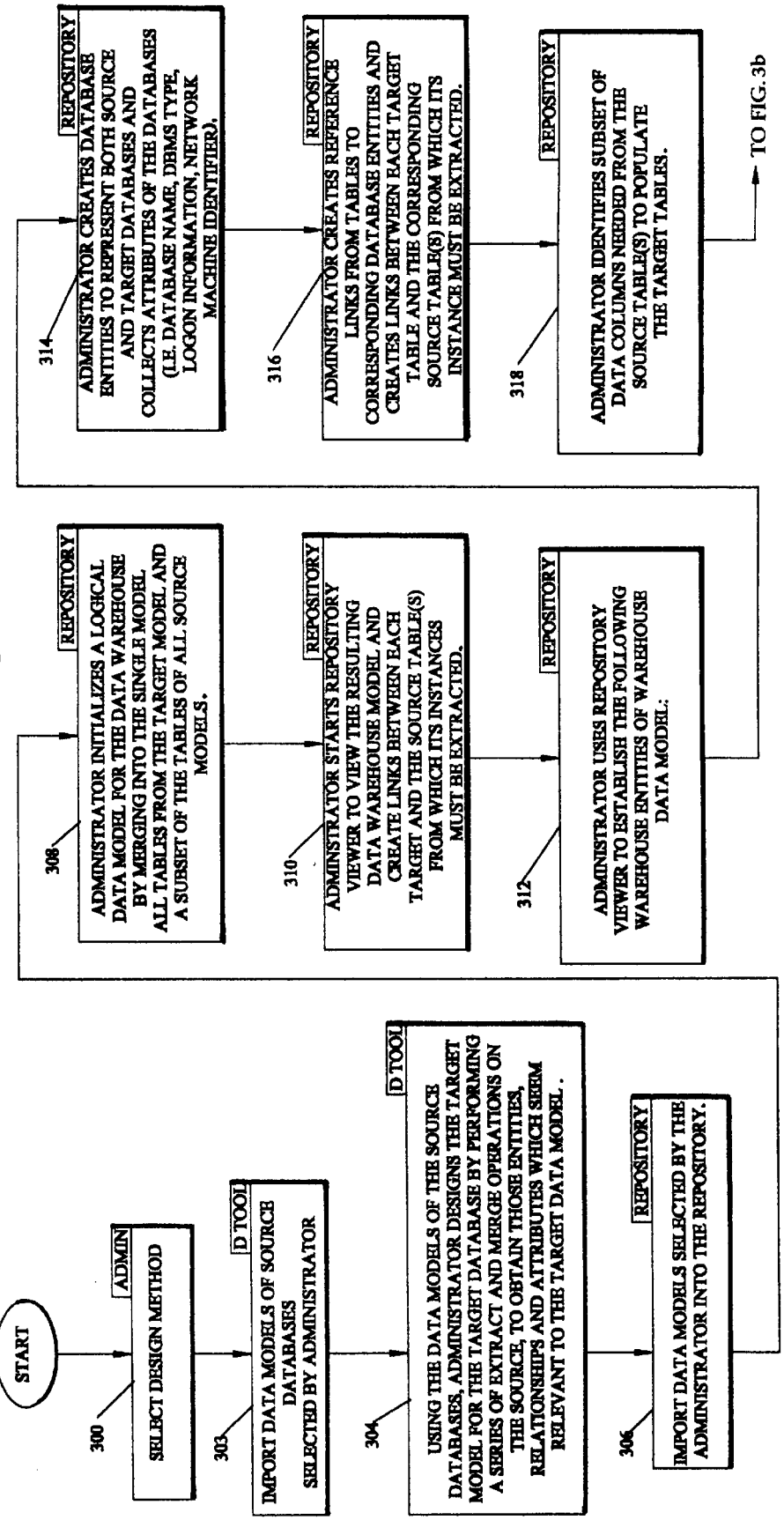

METHOD AND APPARATUS FOR AUTOMATICALLY POPULATING A DATA WAREHOUSE SYSTEM

BACKGROUND OF THE INVENTION

1. Field of Use

The present invention relates to systems and methods for accessing databases and more particularly to systems and methods for populating data warehouses.

2. Prior Art

As is well known in the art, there are many visual tools for managing the process of populating the data tables of a data warehouse. The term "data warehouse" is generally used to describe a database containing data that was gathered from a variety of sources (e.g. existing production databases). For more information regarding the nature of a data warehouse, reference may be made to the article entitled, "Data Warehousing: An Introduction" by Grayce Booth which appeared in the May/June 1995 issue of the Bull S.A. technical journal entitled, "Technical Update."

The process of populating such data tables is typically carried out by a series of warehouse requests that an administrative tool executes. Each warehouse request has subcomponents called "Events" that are used to complete a finite portion of the work of the particular request. Examples of such Events are Extract, Transfer, Transform and Load.

The data warehouse tables are typically designed during the warehouse design process. During this design process, the definitions of the source database tables from which all the data is gathered from existing production databases is captured. The results of the design phase are stored in a metadata repository.

Each warehouse request is typically developed by a system administrator using an interactive tool to describe the sequence of Events of each warehouse request that are necessary to create the data warehouse tables. During this process, the definitions of the database schemas are received from a metadata repository, and utilized by the interactive tool.

The tool is used to develop the sequence of "events" of the request that are to be executed during the warehouse request execution process. At the end of the process, the system administrator finally agrees to the request definition and is provided with the opportunity to schedule the time at which the request is to execute. The described "events" are used to drive the work of a warehouse creation server process. The server process interprets the entries of the visual request display and causes the execution of those processes necessary to execute the warehouse request. This generally involves extracting data from an existing database located in one system (i.e., source database), moving the data to a target system (i.e., the location of a target database), transforming the data to match the requirements of the target database, and then storing the data in the target system database.

An example of the above type of system is the distributed data warehouse (DDW) middleware described in the article entitled, "The Distributed Data Warehouse Solution" by Kirk Mosher and Ken Rosensteel that also appeared in the above referenced May/June 1995 of the Technical Update Journal. In this system, a key element of the system is the distributed data manager/data replication manager (DDM/DRM) component that provides a simple way for a system administrator to extract data from existing databases and then move the selected data to a data warehouse. The system administrator uses a SQL builder tool to describe the data to be extracted from the database. All data is conceptualized using a common relational model. The administrator generated SQL statement forms a request to the DDM/DRM component to extract the data from the particular database. The DDM/DRM component includes a metadata manager component that provides the system administrator with information about the warehouse data and allows the administrator to view and modify the metadata. The arrangement allows an administrator to automate and customize the entire process of data extraction, data transfer and data warehouse loading by developing the specific warehouse requests to be scheduled for execution.

A paper entitled, "Bull Warehouse Initiative" prepared by Wayne W. Eckerson, Patricia Seybold Group© 1996 discusses the enhancement of a metadata repository called Design Manager developed by Transtar Inc. to work in tandem with other Bull warehouse components. The paper also discusses future enhancements of the Design Manager to enable administrators to perform warehouse mappings in the Windows client component of the Design Manager and store them in the repository in addition to using the Design Manager to store all data warehouse metadata, not just database schema and source-to-target mapping information. This information includes transformation rules, extraction, transfer-load statistics and events. The above described Design Manager repository would be enhanced to function as a full fledged data dictionary for metadata that works with other warehouse components.

But, the above described systems do not relieve an administrator from still having to perform time consuming tasks relating to the creation of warehouse requests. Also, from the above, it is seen that the warehouse request generation process can be quite time consuming. This is true because data warehouses typically have complex structures organized for efficiency of data retrieval. In generating the requests, data must be gathered from multiple database systems on multiple machine nodes. The database systems may be of different types or from different vendors. Thus, the gathering process can be quite complex. Once gathered, the data needs to be merged. But the merge can be complicated because of differences in the way the data has been recorded in the different systems. Finally, there is the physical efficiencies to manage. Large amounts of data must be moved efficiently. Processes must be done in parallel, when possible. The processes must be sequenced with dependencies, and carried out as soon as the dependent processes finish. Hence, a system administrator having detailed knowledge of the underlying data structures and the SQL programming language is still required to expend substantial time in constructing such requests.

Accordingly, it is a primary object of the present invention to provide a system and method for facilitating the warehouse request generation process.

It is a further more specific object of the present invention to provide a graphical interface that allows a system administrator to view the different components of warehouse requests for analysis prior to execution by the warehouse system.

SUMMARY OF THE INVENTION

The above objects are achieved in a preferred embodiment of the present invention that provides a system and method for automatically generating warehouse requests. In accordance with the teachings of the present invention, specific predefined data generated during the design phase, in addition to the definitions of database schemas is stored in the repository of a data design tool that has been integrated with the data warehouse's data replication manager (DRM) component. This component is used for generating the warehouse requests for carrying out the process of populating the data warehouse. This process involves migrating non-relational data to UNIX or Windows NT based servers, cleaning and transforming the data as it is moved to the target database and performing data warehouse administrative tasks.

In accordance with the teachings of the present invention, the repository is integrated with the components of a data warehouse system in a manner that such predefined specific data can be reused during the warehouse request creation process. The repository will always contain the definition of database tables and their attributes. It is also possible within the repository to merge the schemas of the multiple input schemas with the design of the target schema. For the purpose of implying the source of each data element that is in the target database, inference links are introduced that relate target database tables and columns to their related source database tables and columns.

To complete the information that will be needed by the warehouse data replication manager, a plurality of new objects is introduced into the repository schema through an extensibility feature of the repository. In the preferred embodiment, the new objects are: 1) database object type, 2) warehouse request object type, 3) relationships between database objects and their related table objects, 4) relationships between warehouse request objects and their related target tables, and 5) relationships between target table attributes and their related source table attributes. Attributes of the database include information sufficient for locating and accessing the specified data within the particular database. In the preferred embodiment, this information includes DBMS name, DBMS type, logon information, and machine identifier (Internet address). Attributes of the target and source tables are the columns or fields of those tables.

In accordance with the teachings of the present invention, during the warehouse creation process, the system administrator need only to enter the name of a particular warehouse request object name and the system's data replication manager automatically generates a visual representation of the sub-components of the particular request by accessing the predefined data. The sub-components define: the data that must be accessed from the source databases, the identification of any data movement activities that must take place to allow data to be combined or taken to the target system, the identification of any merge operations that must take place and at what node, the identification of data load operations (i.e., there could be multiple target tables that need to be loaded from the source of a single table). All of the sub-component operations are identified for potential parallel operation (extracts are done in parallel), transfers can proceed when dependent extracts are completed, merge or join operations are dependent on transfers or extracts, and finally parallel load operations may proceed once their dependent operations are complete. The system administrator is able to view or enhance the information associated with the subcomponents of the request by sequencing through a series of menus that speeds up considerably the precise definition of the Request. The visual nature of the presentation merged with the data from the repository concerning the detailed objects and attributes from the source database and target databases is an important aspect of the invention. The administrator can view the request from the highest level, while the software system manages the details of the object extraction, merge, and load by viewing the design details of the repository.

The above objects and advantages of the present invention will be better understood from the following description when taken in conjunction with the accompanying drawings.

BRIEF DESCRIPTION OF THE DRAWINGS

FIG. 1b illustrates in greater detail, the data replication manager (DRM) component of FIG. 1a.

FIG. 1c illustrates in greater detail, the operational flow of the warehouse designer client component of FIG. 1a and the interfaces associated with the DRM component of FIG. 1a.

FIG. 1e illustrates the organization of menus utilized by the graphical interface of the DRM component of FIG. 1a.

FIGS. 3a and 3b are flow charts used in describing the operation of the present invention.

DESCRIPTION OF THE PREFERRED EMBODIMENT

FIG. 1a

Figure 1A:
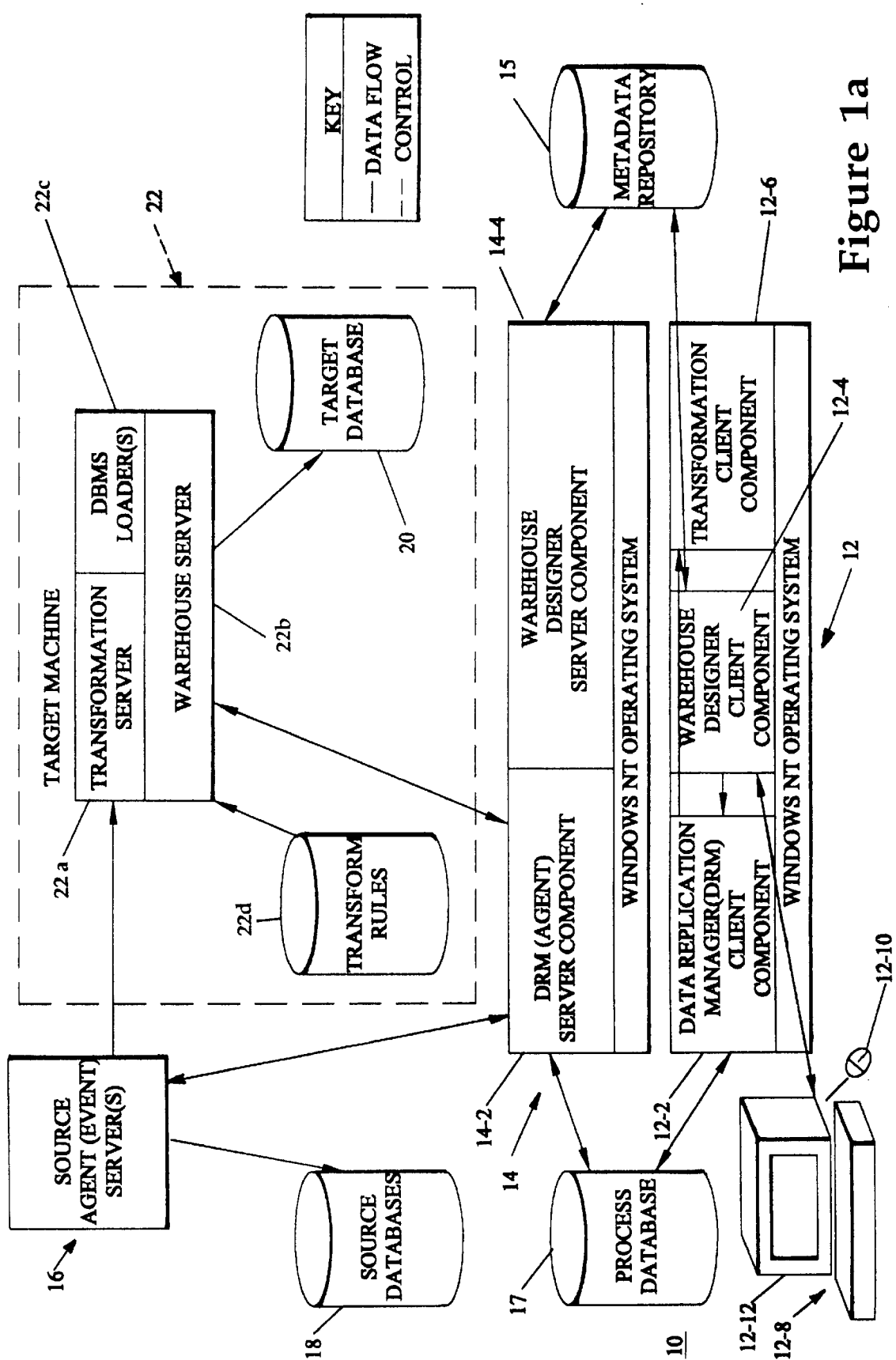
FIG. 1a is an overall block diagram of a data warehousing system that includes the method and apparatus of the present invention.

FIG. 1a is a block diagram of a distributed data warehousing (DDW) system 10 that includes the method and apparatus of the present invention. As shown, the data warehousing system 10 includes a client subsystem 12 and a server subsystem 14 which are both Windows based applications. To enable warehouse events to be executed across distributed and heterogeneous machines, system 10 utilizes a number of configurable event servers 16 that function as "agents". The agents 16 operate to execute the events of a warehouse request. This involves a situation in which the data from a source database 18 is extracted, transferred, transformed and loaded into a target database 20 via corresponding ones of the components of warehouse subsystem 22 (i.e., a transformation server component 22a, warehouse server component 22b and DBMS loader component). In the preferred embodiment, the source database 18 represents all of the data sources from which data will be extracted to populate the data warehouse. Such sources could be mainframe computer systems, UNIX based systems supporting relational databases, Windows NT systems supporting relational databases or the Web. The target database 20 represents the database that implements a data warehouse or a data mart. The operating system provides transfer applications such as FTP, CFT and UFT that are used to transfer the extracted data.

As shown, the client subsystem 12 includes a data replication manager (DRM) client component 12-2, a warehouse designer client component 12-4 and a transformation client component 12-6 that interface as indicated. The server subsystem 14 includes a DRM server component 14-2 and a warehouse designer server component 14-4. The warehouse designer client and server components 12-6 and 14-4 share design generated "metadata" accessed via a data repository 15 that forms part of the warehouse designer component.

The warehouse DRM client and server components 12-2 and 14-2 share object oriented data contained on a process database 17 which is accessed by components 12-2 and 14-2 via open database connectivity (ODBC) software. Because ODBC provides database independence, the process data can now be stored in any database system supported by ODBC.

The DRM client component 12-2 provides the visual interface to the warehouse middleware software, allowing the system administrator to develop warehouse requests to move data from one database system to another, then to review the status of each request. The DRM client component 12-2 is also the component that integrates the rest of the middleware software components by receiving "the design" from warehouse designer client component 12-4 and forwarding it to the server component 14-2 and transformation client component 12-6. The major function of the DRM client component 12-2 is to visualize and manage the process of populating the data tables of the data warehouse as described herein.

The warehouse designer client component 12-4 interfaces with a commodity design tool to capture the "data models" of the different databases containing data to be used in populating the data warehouse database. A data model represents the objects that make up an application environment, plus the relationship among those objects, in the form of definitions of records, fields, data types and values and their meanings. The commodity design tool is conventional in design and may for example, take the form of the Power Designer tool marketed by Sybase, Inc.

The warehouse designer client component 12-4 includes a repository tool that is an object-oriented tool that may take the form of the Rochade Repository Environment developed by Viasoft, Inc. The Viasoft tool includes an object-oriented repository for storing data models in the repository's repository information model (RIM) that is a meta model analogous to the purpose of an RDBMS. The Rochade repository is fully customizable and extensible.

Within the Rochade repository there are three basic types of objects: items, attributes, and links. Items represent entities and can have descriptive attributes associated with them. Links define the relationships between items and can be automatically generated when one item definition refers to another item.

Alternatively, the repository tool may take the form of the repository tool developed by Transtar Inc., a subsidiary of Bull S.A. The Transtar repository tool includes translators or converters for translating the data model developed by a design tool into the Neutral Information Model (NIM) format for storage in the repository. The NIM format is independent of any specific tool or methodology. For further information about the Transtar repository, reference may be made to the article entitled "Tool Integration via a Neutral Information Model" by Dr. Yeshayahu Artsy and Marc Chanliau that appeared in Volume 6 No. 2 issue of the Technical Update Journal, Copyright Transtar, 1996. An example of a repository is also disclosed in U.S. Pat. No. 5,727,158.

For the Rochade repository and other Repositories, the introduction of new object types and new relationship types is done via a feature called extensibility. Once the object and relationship types are introduced, they can be populated through visual editors provided by the repository tool. This aspect is discussed in greater detail in connection with FIGS. 1*d* and 3*a*.

As discussed in further detail herein, the warehouse designer client component 12-4 is invoked during the warehouse design process to develop the population scheme of the data warehouse tables. The schema of the source database 18 (i.e., a description of a database to the database management system, DBMS, generated using the data definition language, DDL, provided by the DBMS) is captured either using the warehouse designer component's translator or using a database design tool (e.g. PowerDesigner Data Architect marketed by Sybase, Inc.) The database design tool is also used to develop a design for the warehouse database. Within the warehouse designer component, the system administrator is able to describe the relationships of the target database tables to the source database tables. The administrator also designates a series of warehouse requests and database objects. The requests, the related warehouse table descriptions, the definition of each source table from which the warehouse tables are to be derived, and the attributes of databases involved are accessed by the DRM client component 12-2 from the warehouse designer component API 12-4.

The transformation component 12-6 transforms the data extracted from the source database 18, according to the transformation rules some of which are gathered by the repository and some of which are provided by the administrator, before loading the data into the warehouse target database system. The transformation component 12-6 applies the transformation rules to the extracted data and supplies a resultant data file in a format suitable for the load utility of the target database type. The transformation component 12-6 also creates any file required by the target database (i.e., utility) to describe the transformed data. More specifically, the transformation component 12-6 performs many types of operations including: changing data types or data lengths (known by the repository); identifying a subset of columns, including their order from multiple source tables (known by the repository); renaming tables and columns (known by the repository); selectively including a subset of records from the input data source based on values or derived values in the data source; splitting the input source into multiple target tables, conversely merging multiple source tables into one target table (known by the repository); producing derived output values based on calculations, string operations like concatenation, substring, etc.; and producing derived columns based on lookup values. For the purpose of the present invention, the transformation component 12-6 may be considered conventional in design. For example, the component may take the form of the ReTarGet product marketed by Rankin Technology Group. The transformation process is started and monitored by the DRM scheduler facility. The transformation component 12-6 writes a set of output files to indicate its success/failure, including any error messages that are to be reported. These files are read by the DRM Server component 12-2 and reported back through the process database 17 to the DRM client component 12-2 for display to the administrator.

The client subsystem 12, server subsystem 14, the source and target systems may be run on the same hardware platform or on different hardware platforms as a function of the overall established system configuration. In the preferred embodiment, the client and server subsystems 12 and 14 are assumed to run on separate interconnected computer systems. More specifically, the components of the client subsystem 12 are run on the personal computer (PC) system 12-8 of FIG. 1*a* under the control of the Windows NT operating system developed by Microsoft Corporation. The components of server subsystem 14 are run on a multiprocessor system under the control of a UNIX based operating system such as the AIX operating system developed by IBM Corporation. It will be appreciated that other computer and operating system configurations may be utilized for running the client and server subsystems 12 and 14.

For ease of explanation, only the client subsystem computer system is illustrated in FIG. 1a. As indicated, the client subsystem runs on a personal computer system 12-8 that includes a central processing unit (CPU), disk storage, random access memory (RAM) and an input keyboard. The PC system 12-8 further includes a mouse or pointer device 12-10 and a CRT video display 12-12. The client subsystem application includes a graphical interface (GUI) that can be viewed by a user or system administrator via display 12-12 and mouse device 12-10.

FIG. 1b

Figure 1B:
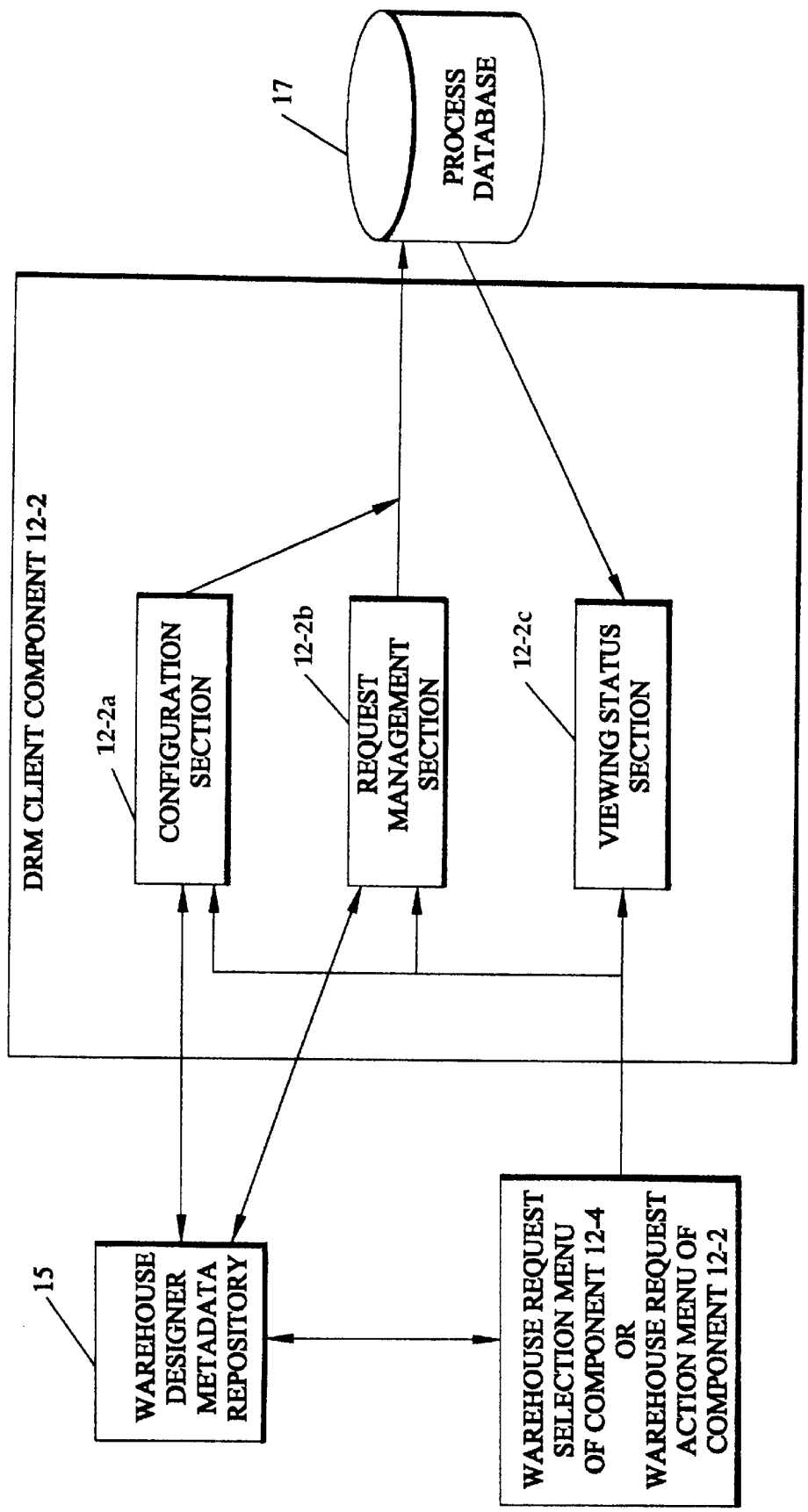

FIG. 1b illustrates in greater detail, the components of the DRM client component 12-2. As shown, DRM client component 12-2 includes three major sections which correspond to a configuration section 12-2a, a request management section 12-2b and a viewing status section 12-2c. As indicated, each of the three sections provide graphical user interfaces (i.e., menu driven interfaces) to different sections of warehouse designer client component 12-4. Additionally, sections 12-2a and 12-2b have interfaces to warehouse designer metadata repository 15. The section 12-2c has an interface to the process database 17.

The configuration section 12-2a is utilized in defining the databases and nodes of the network that will be accessed during the warehouse creation process. The configuration section 12-2a is used to gather "physical" properties of each of these entities (i.e., data source, table or the like) that will be needed when the warehouse requests are defined and then executed. For the configuration of each entity, the configuration section 12-2 provides a "wizard" that guides the system administrator through a series of menu screens that gather properties necessary to configure the entity. In the case of the Transtar tool, this section is invoked by the warehouse designer component when the system administrator starts defining a database object within the warehouse designer repository. This capability is implemented by special DRM client OCX software that provides the configuration interface.

The request section 12-2b is used to display graphically, user selected requests from a list of DRM warehouse requests generated by the section for processing by a system administrator. This section also enables the system administrator to set up the schedule for running the request. As indicated, warehouse request section 12-2b directly interfaces with components within the warehouse designer component 12-4. The extent to which these components are integrated is a function of the repository tool selected. This interface in the case of the Transtar tool enables a system administrator to invoke the DRM client component after having selected a designer request object created with the warehouse designer component 12-4. This action causes the DRM client component to gather information about tables, columns and databases from the designer meta database stored in repository 15 to form the display of events of the request that the designer information implies.

In the case of the Rochade tool, the DRM component would also read the Rochade Repository to gather the information about the tables, columns, and databases to form the display of events of the request formed during the design. The difference being that the DRM and the Repository interface would not interact. The interfaces would be integrated through the use of the common repository data and the warehouse objects added to the repository.

The viewing status section 12-2c operatively couples to the Process Database 17 and is used for displaying two levels of status, request status and event status. Status is recorded in the Process Database as the Request is executed and monitored by the DRM Server Component 14-2. This section is invoked via the DRM tools menu provided via the GUI interface of the warehouse designer client component 12-4. When invoked, the viewing status section can be made operative to display a list of the status of the DRM requests scheduled for execution and graphic display of such requests including the states of individual events associated with a particular request denoted by different colors. The section has the capability of identifying states such as Wait, Hold, Run, Fail, Done, etc. and the screens associated therewith include a legend for interpreting such states.

The viewing status section includes tree generation software for enabling a user to view all the events of a particular request's sub-components in a sub-component tree structure. The section also includes components that allow a user to modify various event properties as a function of the status of the request. If a particular event failed within a request, the user will be allowed to restart the event that failed. The section also allows a user to stop a request when the request is in a run state. The important aspect of the viewing status section is the visualization capability provided for this type of information being made available to the administrator which in turn facilitates the carrying out of warehousing administrative functions.

In the case of the Rochade repository tool, the different sections 12-2a through 12-2c of the DRM client component 12-2 are invoked by the DRM client component 12-2 via its graphical interface as discussed herein. This eliminates the need to make internal changes to a particular repository tool. Thus, off-the-shelf repository tools can be used in conjunction with the present invention. Since much of the discussed functionality is known in the art, the details of such tools are not described in detail herein.

Figure 1C:
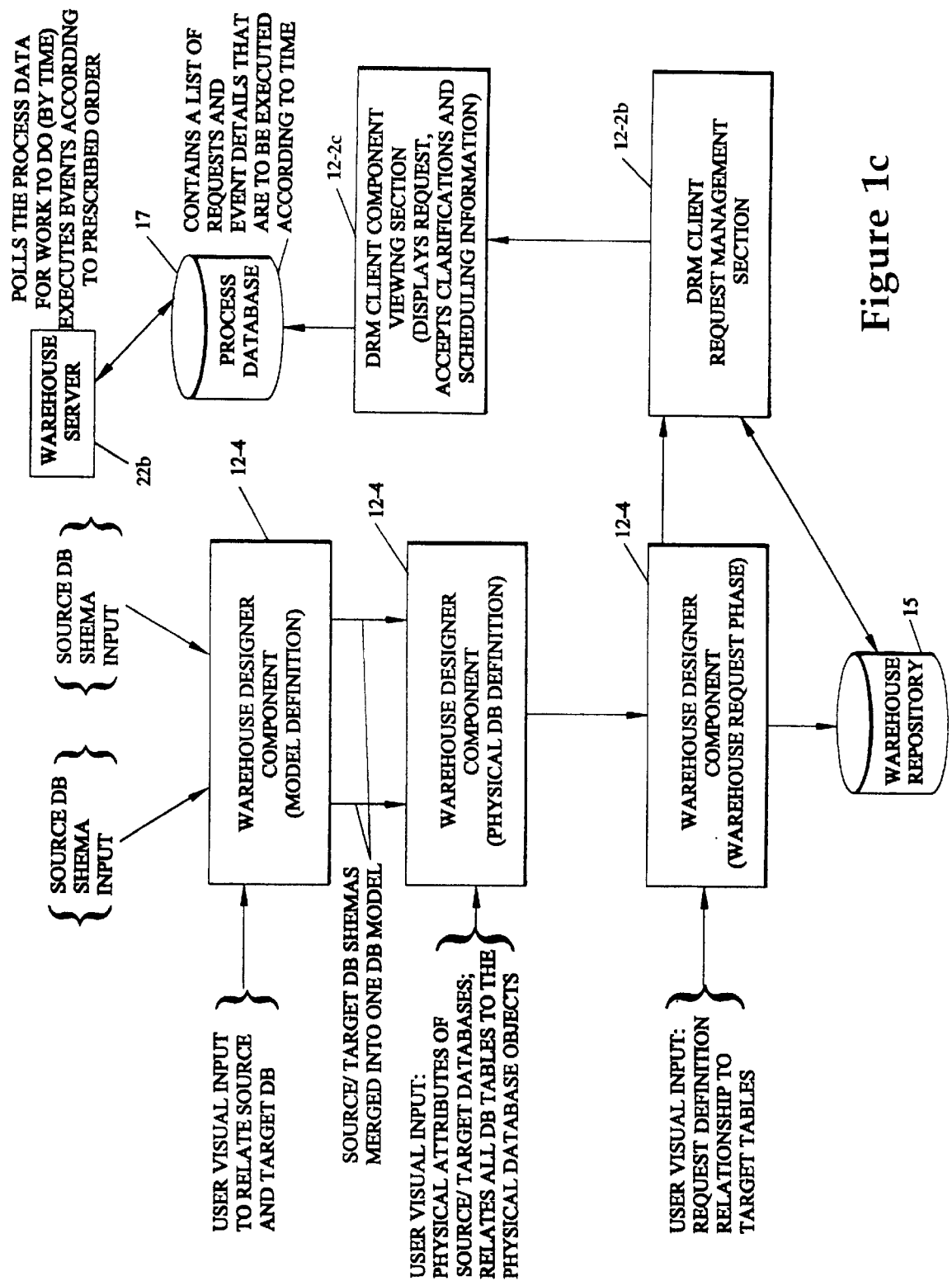
Figure 1D:
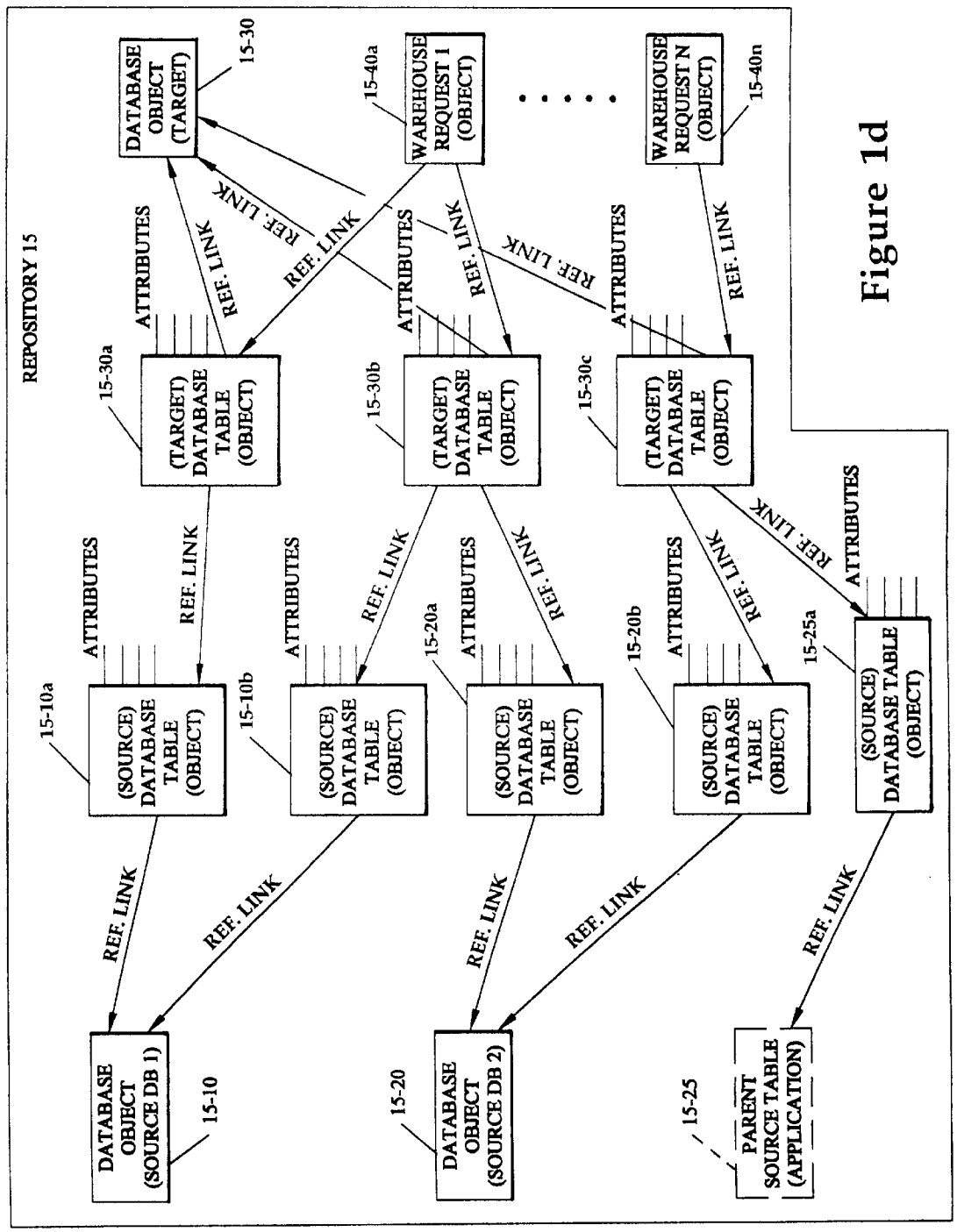
FIG. 1d illustrates in greater detail, the organization of the designer repository of FIG. 1c in accordance with the teachings of the present invention.

FIG. 1d illustrates in greater detail, the organization of repository 15 in accordance with teachings of the present invention. As indicated, repository 15 includes a plurality of new objects that are introduced by the administrator during the warehouse design phase. The new objects include the database objects 15-10 and 15-20, source database table objects 15-10a, 15-10b, 15-20a and 15-20b, target database table objects 15-30a, 15-30b and 15-30c, target database objects 15-30 and warehouse request objects 15-40a through 15-40n. Briefly, the administrator using the repository introduces the different types of objects required to populate the warehouse (target) tables. The administrator also adds the different reference links that establishes the relationships between the database objects and their related table objects and the relationships between the warehouse request objects and their related target table objects as indicated in FIG. 1d. The repository tool gathers the attributes for locating and accessing the specified data tables, such as database management system (DBMS) name, DBMS type, logon information and network machine identifier (e.g. internet address) and stores all data in the Repository for subsequent access by the DRM tool. In a similar manner, the attributes of the source tables (i.e., the data fields or columns of the table) that are to be used in populating the target tables, and their relationship to the attributes of the target tables are identified during the design process. For example, this may be carried out using a lower level display containing objects representing the source and target table attributes wherein the administrator draws lines (i.e., reference links) between source and target table attributes for indicating the source table attributes to be used in populating the target table(s).

Additionally, there may be existing objects within the repository 15 that the administrator may choose to utilize. For example, if an administrator wanted to include data not contained in source databases, the administrator would draw reference links to such existing sources rather than new object sources. This functionality is represented by an existing source shown in dotted form such as block 15-25 that has a reference link to block 15-25*a*.

FIG. 1*e*

This figure illustrates the overall menu structure/interfaces utilized by the DRM client component 12-2. The menu structure is implemented using Visual Basic software sold by Microsoft Corporation. As indicated in dotted lines, for the Transtar repository tool, there is at least one menu that is used to invoke the DRM client component 12-2. This menu provides a display of the different designer request objects created by an administrator using the warehouse designer component 12-4 during the design phase. The display shows a visual representation of the objects stored in repository 15, such as shown in FIG. 1*d*.

Figure 1E:
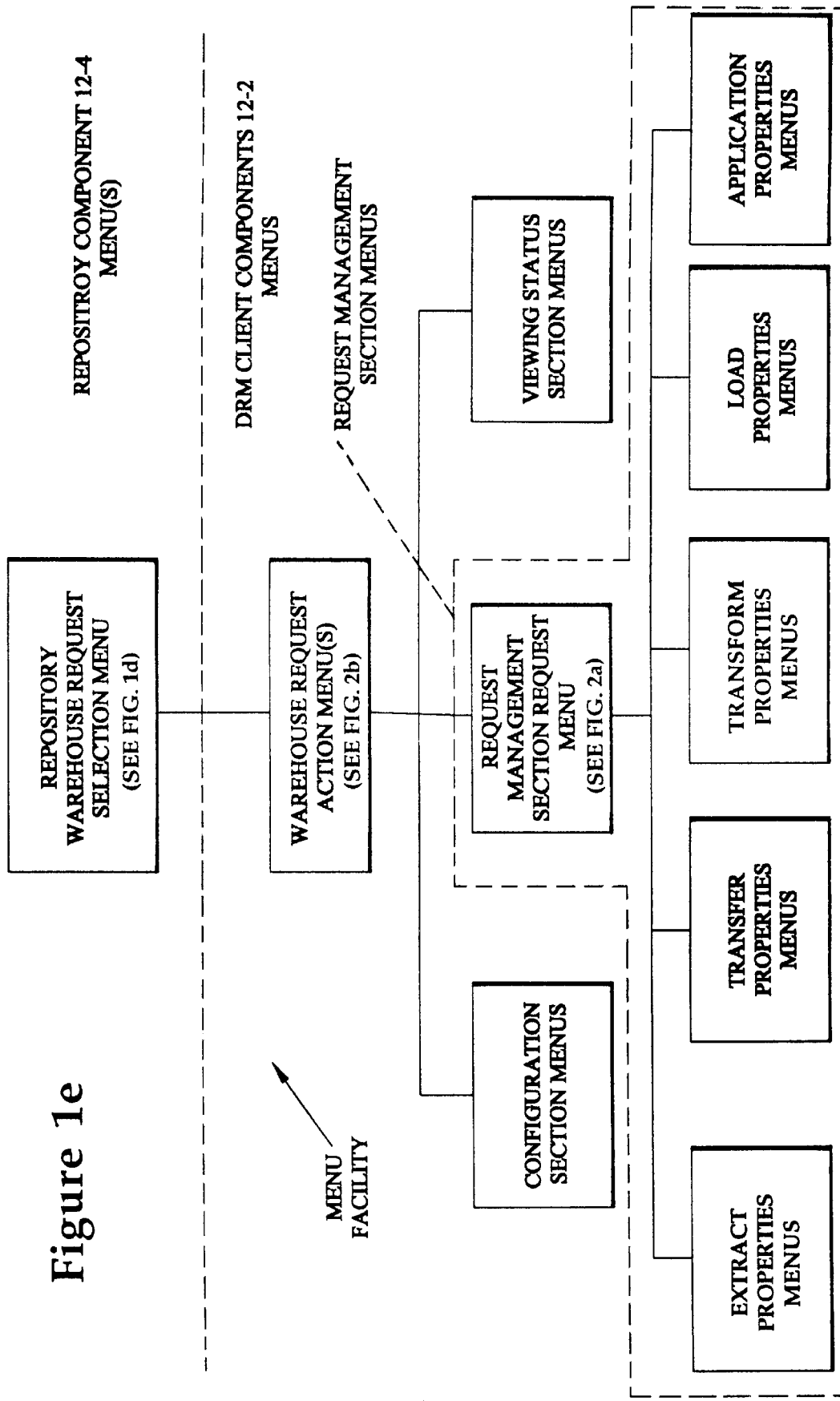
Figure 2A:
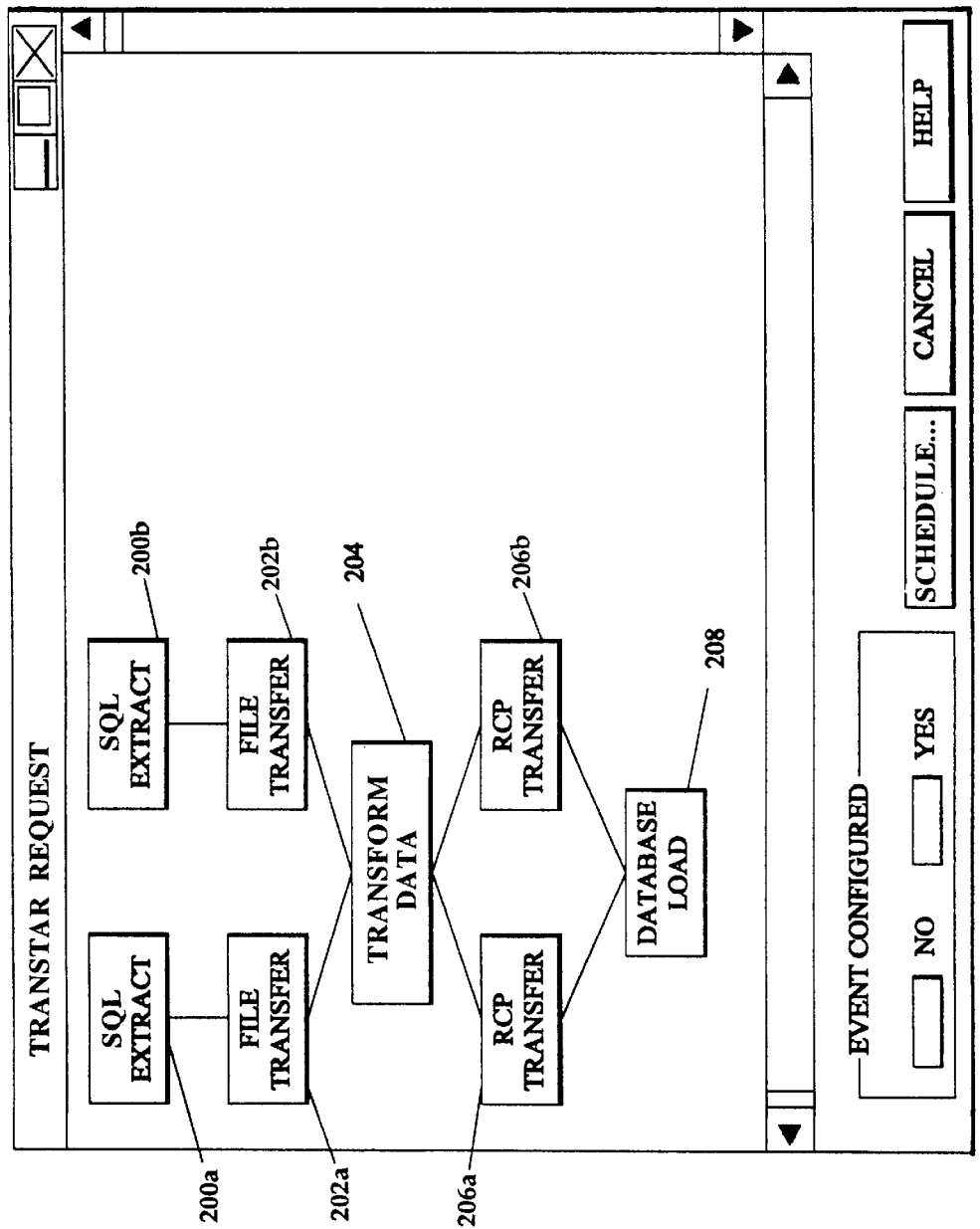
FIGS. 2a through 2f are a series of menus utilized by the system of the present invention.
Figure 2B:
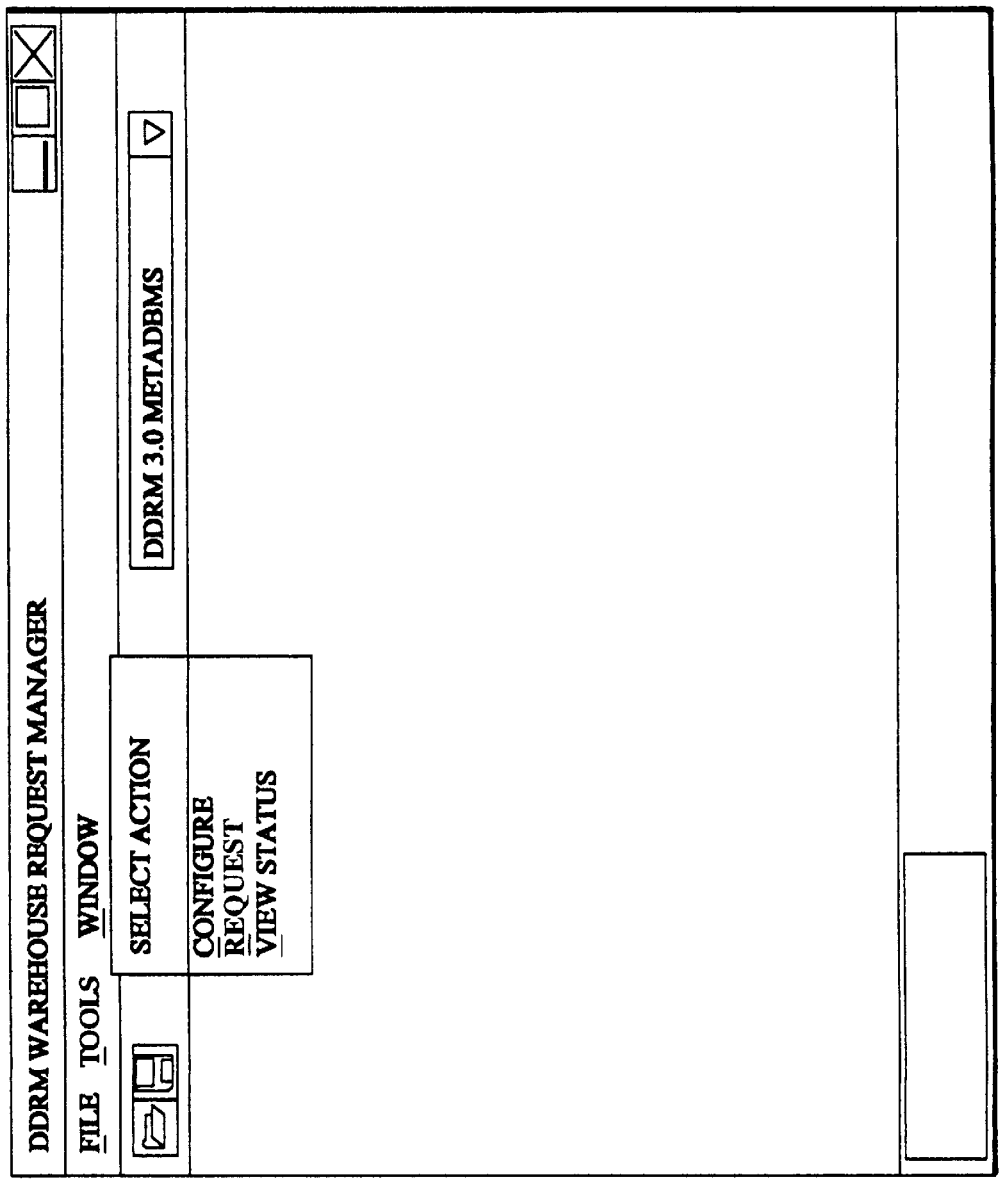
Figure 2C:
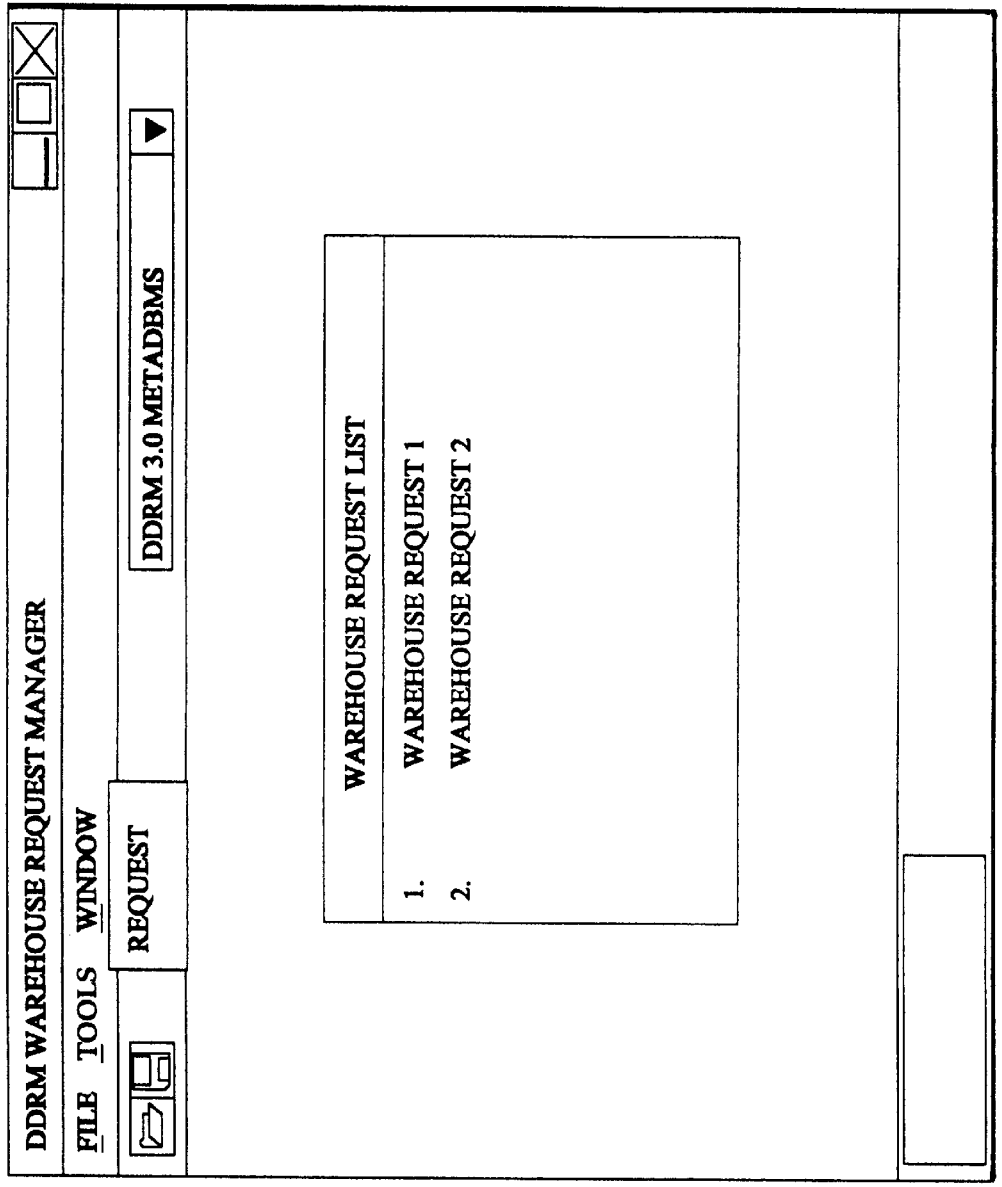

When the repository tool such as the Rochade tool is used, the DRM client component is invoked by the administrator through the use of one or more action menus wherein the administrator can select the DRM section to be activated (i.e., establish the DRM operating mode-configuration, request management or status viewing). An example of an action menu screen is illustrated in FIG. 2*b*. As indicated in FIG. 1*e*, there are three sets of menus that are utilized by corresponding ones of the DRM sections 12-2*a* through 12-2*c*. These sets are the configuration section menus, the request management section menus and the viewing status section menus. The request management section menus include the menus that are particularly pertinent to the operation of the present invention.

Accordingly, in FIG. 1*e*, it is assumed that the administrator has selected the request management section to be activated. In this case, a further action menu would be displayed that provides a list of the warehouse requests obtained from the repository. The selection of a warehouse request results in the display of a further menu illustrating the subcomponents (events) of the selected warehouse request, such as shown in FIG. 2*a*. It will be appreciated that the viewing status section also makes use of this same menu for examining the status of previously saved requests.

This menu leads to a next level of menus that are used for displaying properties of the different subcomponents of the selected warehouse request. As indicated, these subcomponent menus include menus for displaying extract properties, transfer properties, transform properties and load properties. The last set of menus in this level is the application properties menus that are used to provide data for populating the warehouse tables which is not contained in any of the existing database sources. The following indicates the type of physical properties that would be displayed for the different subcomponents for each warehouse request.

Extract Event Properties

The properties that would be displayed for an extract subcomponent include: the SQL statement to perform the Extract; database name; database type; event description; agent to perform the extract and host where the agent resides. The extract properties that could be modified include the SQL statement wherein a WHERE clause could be appended to such statement, and the event description. The extract subcomponent menus are discussed in greater herein.

Transfer Event Properties

A transfer event moves one data file and description file pair. The transfer event logically follows the completion of a single extraction. If within the warehouse request there are multiple extraction operations, there will be a separate transfer event that will be started for each extract. The extract/transfer pairs will work in parallel to maximize throughput. The properties that would be displayed for a transfer event or subcomponent (i.e., file or rcp transfer) include: transfer type (FTP, CFT, etc. applications); nodes involved in the transfer (i.e., the same for rcp transfer, different for file transfer); directories used for the data movement; agent performing the transfer, option to save or release files after transfer; and event description. The properties that could be modified include the option to save or release file after transfer and the event description.

Transform Event Properties

The properties that would be displayed for a transform subcomponent are the rules provided by the administrator for mapping the individual fields for carrying out the "transformation" of extracted data. These fields are described when a transform icon is selected causing the transformation client component to be invoked.

Load Event Properties

The properties that would be displayed for a load subcomponent include: a table load option (i.e., used to denote new or append, etc.); and event description. Either the table load option or the event description could be modified.

Application Properties

As discussed above, each warehouse request may be modified to include application events. The properties of an application event includes: the identifier of the agent server that will start the application; path to the application; location of the expected output data and description files; USERID/password required to execute the application and the node of the application. The application can be used to perform the Extract.

DESCRIPTION OF OPERATION

With reference to FIGS. 1 through 3*b*, the operation of the preferred embodiment of the present invention will now be described. Referring to FIG. 3*a*, it is seen that the administrator first selects a particular design method as indicated in block 300. As well known in the art, there are basically two methods that can be followed to develop the data warehouse design. The first method termed a bottom-up method, starts by the administrator analyzing the conceptual models of the source databases. The second method termed design from scratch, starts by the administrator designing the warehouse database by creating a conceptual data model based on user requirements without specific considerations of the existing databases. The present invention can be used with both methods but the first method has been selected because it is usually the method most frequently used.

As indicated in block 303, the administrator selects the data models of the source databases to be analyzed and imports them into a commodity database design tool that the warehouse designer client component 12-4 interfaces (i.e., the PowerDesigner DataArchitect tool). As indicated in block 304, the administrator designs the target (warehouse) database from the source database data models using such tool.

The administrator performs a series of data model extract and merge operations on the source databases with the commodity tool to obtain those entities, relationships and attributes which are relevant to the particular target data model design. At this point, the administrator has obtained all of the schemas that are to be considered for use in the target database design.

Next, as indicated in block 306, the administrator selects the data models that are to be imported into the of the warehouse design component's repository tool. The design can proceed at different modeling levels, such as conceptual, logical and physical or schema. The repository tool, enables the administrator to reverse engineer, the conceptual data model of each source database as well as the logical data model (plus some physical characteristics). The same tool can also be used to transform the conceptual data model of each source database into their respective logical data models or into their respective physical data models or schemas. Thus, the data modeling technique used is a matter of design choice.

The operations performed by the administrator with the repository tool are diagrammatically illustrated in FIG. 1c. These operations are also indicated in blocks 306 through 322 of FIGS. 3a and 3b. As shown in FIG. 1c, the administrator performs the following operations with the repository tool: (1) provides visual input for relating the design of the target database (model definition) to the input source databases, (2) provides visual input for defining the physical attributes of the source and target databases and for relating all of the database tables to the physical database objects (physical database definition) and (3) provides visual input for defining the different warehouse requests and their relationships to the target tables (warehouse request phase). These operations result in the generation of a set of new objects and reference links representative of the warehouse design such as illustrated in FIG. 1d.

With reference to FIG. 1d, the operations of FIG. 1c will be discussed in greater detail. As indicated in block 308 of FIG. 3a, the administrator initializes a data model for the data warehouse (target) database using the repository tool by merging into the single data model, all tables from the target model and a subset of the tables of all source models. Then, the administrator starts the repository tool viewer function to view the resulting data warehouse model and for creating links between each target and source table from which instances must be extracted (i.e., block 310).

As indicated in block 312, the administrator uses the repository viewer to establish the entities (objects) of the warehouse data model indicated in blocks 314 through 320. That is, using the repository tool as a graphics drawing tool, the administrator creates a plurality of new objects such as those depicted in FIG. 1d. In the illustrative repository depicted in FIG. 1d, there are two source databases visually represented by blocks 15-10 and 15-20 generated from visual input to the warehouse designer client component 124 provided by the administrator. The administrator has selected two database tables from each source database that are to be used in the warehouse design that are represented by the sets of source database table objects 15-10a, 15-10b and 15-20a, 15-20b. These objects are generated by the Repository Viewer based on visual input provided by the administrator. The administrator represents the target database by a further object that corresponds to block 15-30 in FIG. 1d. The administrator has identified three database tables to be included in the warehouse database design. These tables are represented by objects 15-30a through 15-30c. These objects are generated by the Repository Viewer based on visual input provided by the administrator. Also, as indicated in block 314 of FIG. 3a, the administrator specifies the different attributes of the source and target database objects of FIG. 1d. These attributes include the database name, database type, logon information and network machine identifier. In the manner previously discussed, the administrator identifies the attributes (i.e., represented by the series of four lines in FIG. 1d) of the source tables to be used in populating the target tables using a lower level display containing representations of the source and target attribute objects (e.g. tables listing the different attributes).

Configuration of Objects

In greater detail, when using the Transtar tool, the administrator clicks on each database object that invokes the DRM client component's configuration section 12-2a resulting in the display of a wizard sequence of menu screens for guiding the administrator through the process of entering configuration information. The DRM client component uses the menu sequence for gathering information about the physical properties of the particular entity that will be needed when the warehouse requests are defined and then executed. The information gathered is stored by the DRM client component in the process database 17.

By way of example, it is assumed that the administrator clicks on the source database object 15-10 of FIG. 1d. This causes the DRM client component's configuration section 12 to display as a first menu, the menu screen of FIG. 2f Referring to FIG. 2f, it is seen that the administrator may elect to use an existing source database. When the administrator elects not to use an existing source database then the administrator will advance to the next menu screen by clicking on the "Next" menu button. The DRM configuration section 12-22a is activated to display a next menu screen that will allow the administrator to enter the name of the database, indicate that the database is source database and designate that it is a new database (e.g. by selecting "New" from the File menu option). This will activate the configuration section wizard to lead the administrator through the process of gathering configuration information about that new database. For example, after entering the requested item, the screen will highlight the "Next" menu button that will take the administrator to a next screen. This screen will prompt the administrator for the next configuration value for the source database. The remaining screens in the sequence operate in the same manner until all of the required parameters have been entered by the administrator signaled by the configuration section activating a "Finish" control button on the last menu screen of the sequence. It will be appreciated that the design of the screens and the manner of invoking the screens is a matter of design choice. Further, the same set of screens also may be used when the DRM client component is being operated in a configuration mode. This mode is activated by selecting the "configure" option on the menu screen of FIG. 2b.

Next, as indicated in block 316, the administrator creates the reference links from the tables to corresponding database entities and creates links between each target table and the corresponding source table(s) from which instances must be extracted. Relative to FIG. 1d, the administrator using the Repository Viewer draws lines connecting the various blocks which designate the desired reference links. Also, as indicated in block 318, the administrator identifies the subset of data columns needed from the source tables to populate the target tables by drawing links with the Repository Viewer from the target database table attributes to the source database table attributes.

As indicated in block 320, the administrator specifies a number of warehouse request objects labeled as blocks 15-40a through 15-40n in FIG. 1d that are to be used in populating the warehouse target database. The administrator then links each warehouse request object to the target table(s) that the request will populate. In FIG. 1d, the administrator elected to utilize two warehouse requests (i.e., warehouse request 1 and warehouse request N) to obtain the data for populating the target database from the two database sources located on two different machines. The warehouse request objects are generated by the repository tool from the visual input provided by the administrator and as well as the links between the warehouse request blocks and database table objects. Since the target tables are linked to the source tables, to their columns and to their databases, each warehouse request object identifies the template (i.e., configuration of objects) for such request. At this point, the warehouse target database design is complete and the design contained in the repository 15 corresponds to design of FIG. 1*d*.

As indicated in block 322, the administrator next invokes the DRM client component's request management section 12-2*b*. In the case of the Transtar repository implementation, the administrator can select the request graphically displayed by the Repository Viewer on a menu screen, such as the screen of FIG. 1*d* by highlighting with the mouse 12-10, the warehouse request object block representative of the request and then invoking the DRM client component using a menu bar associated with the menu screen. In the case of the Rochade repository, the administrator invokes the DRM client component 12-2 via the action menu of FIG. 2*b* by selecting the request option. This in turn produces the menu of FIG. 2*c* wherein the administrator is able to select the particular warehouse request.

Figure 3B:
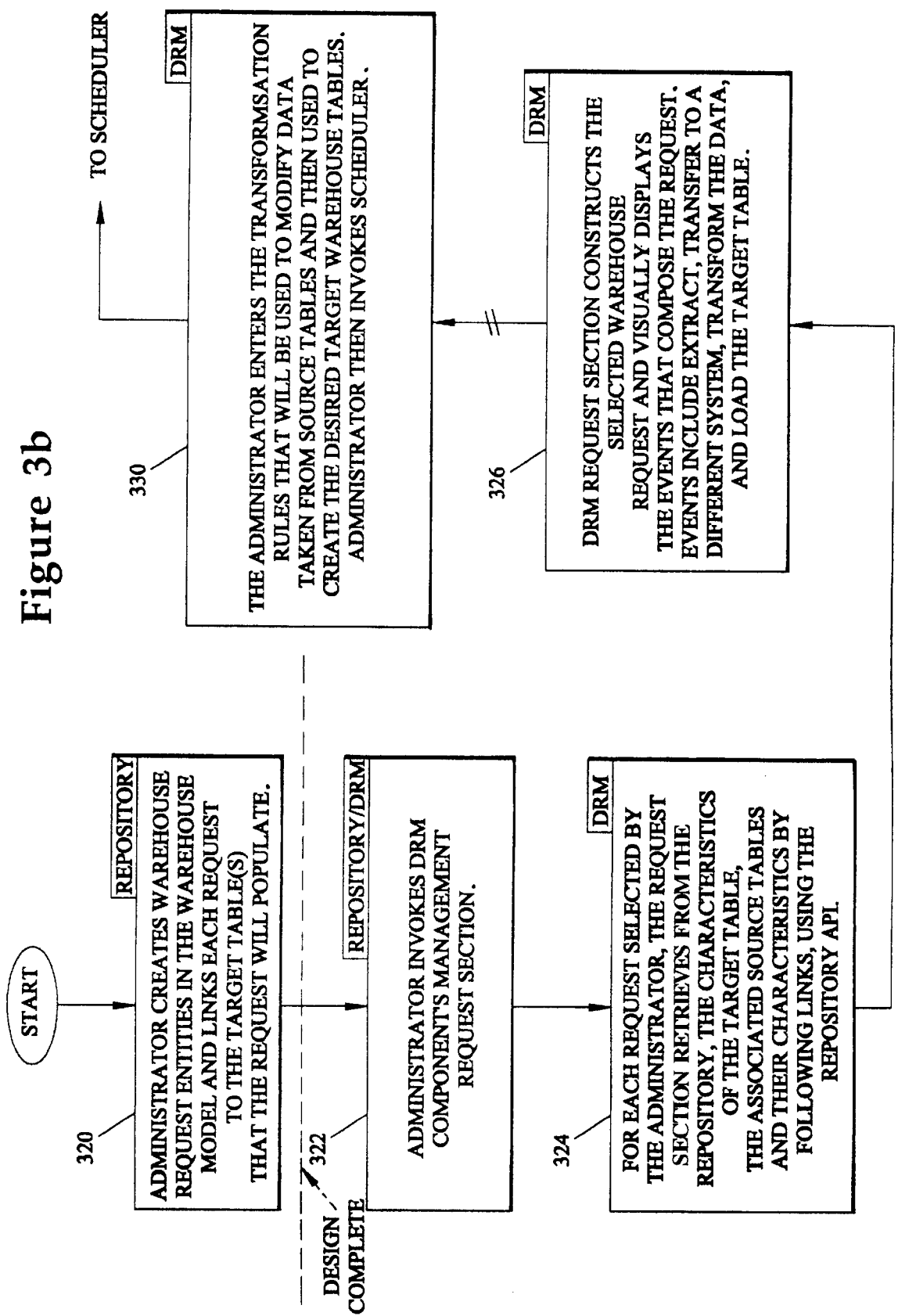

As indicated in block 324 of FIG. 3*b*, the DRM request component operates to retrieve from repository 15, the characteristics/attributes of the target table, the associated source tables and their characteristics by following the links via the repository API. Next, as indicated in block 326, the DRM request component operates to construct automatically, the selected warehouse request and visually display the events or subcomponents that compose the request. This results in the DRM request section generating a menu screen such as shown in FIG. 2*a*. As indicated, the warehouse request contains two SQL extract subcomponent icons displayed by the DRM component request section 12-2*b* to represent the extraction of data from two database sources located on two different machines. Additionally, the warehouse request screen is generated to display two file transfer subcomponent icons denoting that two file transfers are to be performed for transferring the data from each of the two machines to the target database machine. The warehouse request screen is generated to display a single transform subcomponent icon located on the target database machine and two further transfer subcomponent icons denoting the merging the data from both sources for loading into the single target database table. Lastly, the warehouse request screen is generated to display a load subcomponent icon denoting that the merged data is to be loaded into the target database.

Figure 2D:
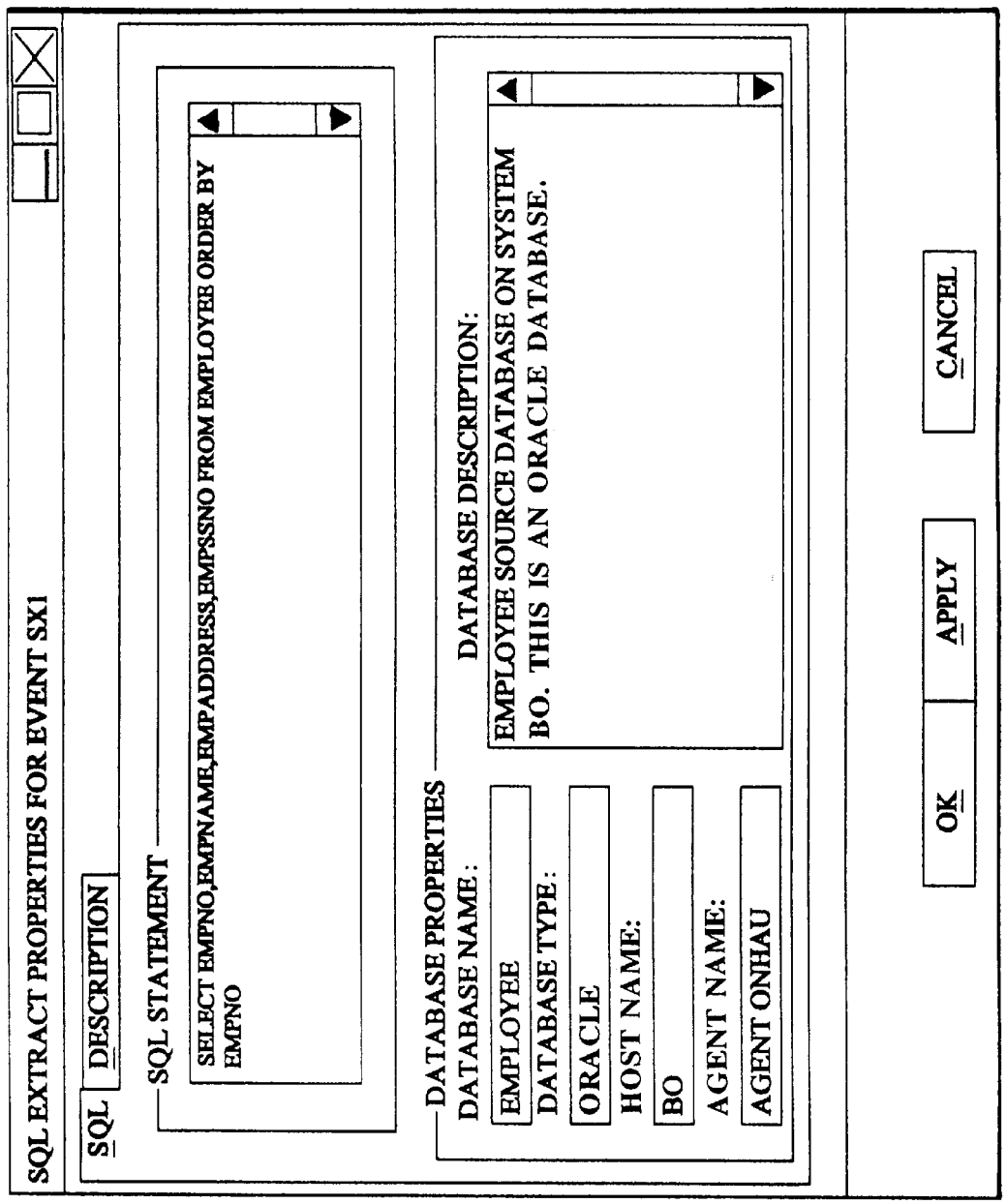

The administrator is able to visually examine the request and input properties related to specific events. By clicking the right mouse button on the SQL extract event icon, the properties of the extract are automatically displayed to the administrator. For example, by clicking the right mouse button on the SQL extract event icon, the properties of the extract are automatically displayed to the administrator. The DRM client request management section 12-2*b* generates the SQL select statement based on columns identified through the warehouse designer component and the SQL statement is displayed as a property. FIG. 2*d* provides an example illustrating the manner in which properties of the extract subcomponent/event are displayed. As shown, the SQL statement is provided in a scroll area while the database properties are indicated in the spaces on the left side of the screen. A further scroll area provides space for the database description. The screen also includes three control buttons that correspond to an "OK" button, an "Apply" button and a "Cancel" button.

As discussed above, the administrator is able to add the WHERE clause to the SQL statement in the place where indicated as well as make modifications to the database description. Following entering modifications, the administrator selects the "Apply" button signaling the DRM client component request management section 12-2*b* to update the SQL statement properties. Once having verified that all of the properties are correct, the administrator selects the "OK" button. This causes the request management 'section 12-2*b* to record any modifications made to the SQL statement properties in the process database 17 that are required for displaying the objects of FIG. 1*d* and for executing the warehouse request by the DRM server component. This aspect of operational flow is illustrated in FIG. 1*c*. The "Cancel" button enables the administrator to eliminate changes made to the properties. As previously discussed, the entries in the process database 17 drive the work of the DRM server component and source agent servers. The DRM server component's function is to interpret the entries of the process database 17 and to cause the execution of the processes necessary to carry out the warehouse request.

The event icons of FIG. 2*a* are color encoded to indicate if they have been sufficiently parameterized to execute. Thus, when an extract event has been configured, the color of the extract icon changes from RED to GREEN.

During the extract process, the DRM client component 12-2 provides an opportunity to allow the indication when source files should be joined in the source database. The DRM request management section 12-2*b* displays a menu screen such as in FIG. 2*n* showing the source files identified in the warehouse designer client component 12-4. If the source files are joined, the SQL statement to join the files will be automatically created by the DRM request management section 12-2*b*. When the DRM request management section 12-2*b* displays the request, the joined files will be represented in FIG. 2*a* as one SQL extract subcomponent icon producing one data file. Also, as indicated in menu screen of FIG. 2*e*, the administrator can introduce WHERE clause conditions as indicated.

Figure 2E:
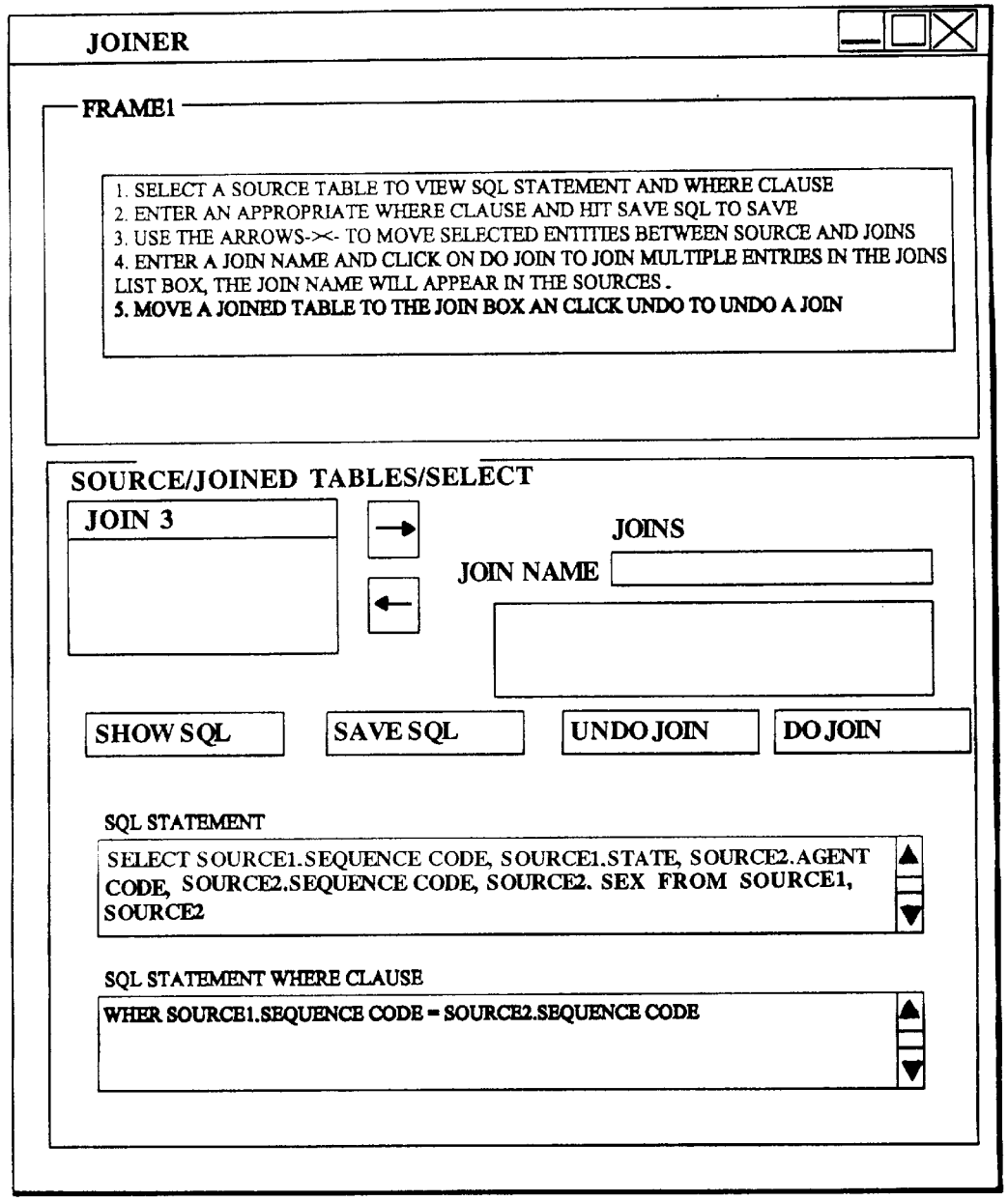
Figure 2F:
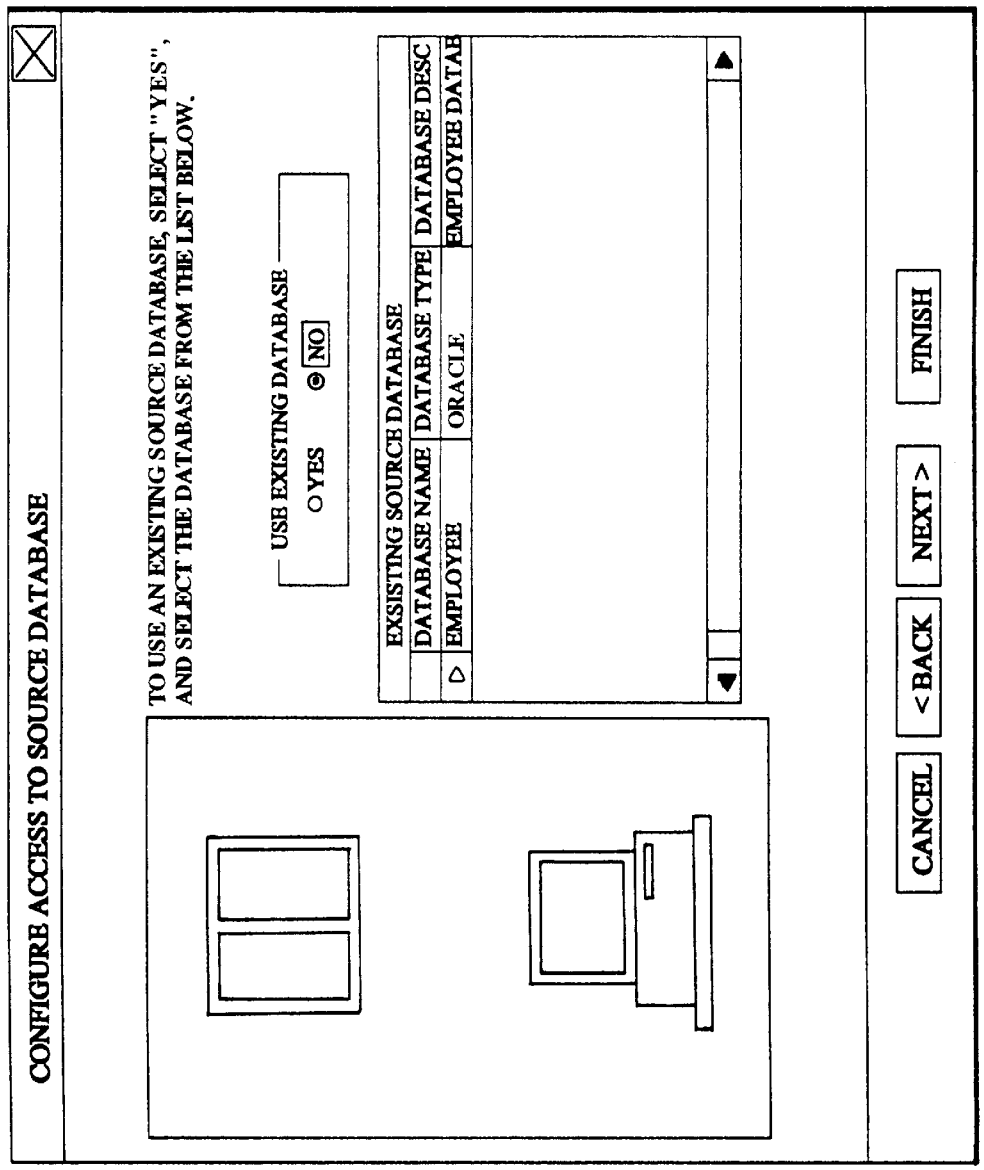

If the "DO JOIN" button of FIG. 2*e* is selected by the administrator, the DRM request management section 12-2*b* generates the resultant SQL statement as indicated in FIG. 2*e*. Once the administrator selects the "Save SQL" button of the menu screen, the DRM request management section 12-2*b* continues operation by displaying the entire request on the menu screen of FIG. 2*a*.

Referring to FIG. 2*a*, it will be appreciated that after having supplied all of the properties of the extract event, the DRM request management section 12-2*b* marks the event as "configured" by changing the color of the extract event on the screen of FIG. 2*a* from RED to GREEN. The administrator carries out same procedure for each of the other request events. The administrator continues to view the properties of the remaining request subcomponents. For example, the administrator will verify that the properties of the transfer subcomponents are correct by clicking on each of the transfer subcomponent icons of FIG. 2*a*. Since the transfer subcomponents can be of different types, the administrator will verify that "FTP" is specified for these two subcomponents. By contrast, the administrator will verify that "rcp" is specified for the next two transfer subcomponents for enabling the transfer of data between two different locations on the same target machine (i.e., an internal transfer effected through the copying of directory entries). After clicking on the transform subcomponent icon, as indicated in block 330 of FIG. 3*b*, the administrator enters the transformation rules that will be used to modify data taken from the source tables that will be used to create the desired target warehouse tables.

Also, as indicated in block 330 of FIG. 3b, after the administrator has configured all of the request subcomponents of FIG. 2a, the DRM request management section 12-2b will enable the selection of the "Schedule" button of FIG. 2a. The administrator's selection of the "Schedule" button causes the DRM request management section 12-2b to display a screen that will enable the administrator to set up the schedule for running the request. After such scheduling is completed for each warehouse request, the administrator can then invoke the scheduler.

From the above, it is seen how the present invention is able to facilitate the generation of warehouse requests. This relieves an administrator from the time consuming and tedious task of constructing such requests. Further, the present invention makes it easier and more reliable to generate such requests.

It will be appreciated that the teachings of the present invention may be used in conjunction with other types of commodity database design tools and repositories. Further, the present invention may be used with repository tools that include database design tool functionality. Also, the menu screens may also be implemented using other types of visual programming tools. Still further, the present invention may be incorporated into other types of data warehouse systems architectures. Many other changes will immediately occur to those skilled in the art.

APPENDICES

I. Glossary

II. Program Listings in Visual Basic of the following routines of DRM Client Component Request Management Section 12-2b:

a. Create All Events Routine b. Create Extract Event Routine c. Create Transfer Events Routine d. Create Transform Event Routine e. Create Load Event Routine Appendix I GLOSSARY
In the field of the present invention, the following terms have the following meanings:

| | |
|---|---|
| 1. schema | A description of a database to the database management system (DBMS) generated using the data definition language (DDL) provided by the DBMS. A schema defines a particular view of some aspect of the database; that is, it defines the attributes (or fields) that will be visible, the domains (permissible values) of the attributes and information concerning the form and location of the attributes. For example, a schema can consist of a number of tables with their referential checks, indexes, rules and procedures. |
| 2. data model | A collection of related object types, operators and integrity rules that form the abstract entity supported by a database management system (DBMS). The DBMS may be relational, network based, etc. depending on the type of data model the DBMS supports. For example, in the relational model, the object types include relations (tables), attributes (columns) and domains (acceptable values for attributes). The operators are those defined by the relational algebra and include SELECT, PROJECT and JOIN. In simplified terms, the integrity rules are (a) no component of a primary key value can be empty, (b) all primary key values must be unique and (c) every non-empty foreign key value must match an existing primary key value. |
| 3. data dictionary | A database containing data about all the databases composing a database system. |
| 4. database management system (DBMS) | A layer of software between the physical database and the user. The DBMS manages all requests for database action (for example, queries or updates) from the user. This eliminates the need for the user to keep track of the physical details of file locations and formats, indexing schemes, etc. |
| 5. data definition language (DDL) | A language, usually a part of a database management system that is used to define all attributes and properties of a database, especially record layouts, field definitions, key fields and sometimes keying methodology, file locations and storage strategy. |
| 6. entity | A fundamental part of an enterprise, such as a person, an order, an item, and so on. Entities are often fundamental elements in a database. The term "entity" is also defined as an item about which information is being stored. An entity may be a tangible object, such as an employee or part or may be an intangible concept, such as event. |
| 7. join | An operation that combines two or more tables based on some common attribute value(s) that the tables share. There is no specific JOIN statement or operator visible to an application developer or user. Any SELECT statement that references multiple tables implies that a join is required. |
| 8. loading | The process of entering data into relational tables after the tables have been first defined or have been redefined after restructuring. Properly called populating. |
| 9. row | The horizontal component of a table. A row consists of a |

GLOSSARY
In the field of the present invention, the following terms have the following meanings:

| | |
|---|---|
| | sequence of values, one for each column of the table. |
| 10. SQL | Originally an acronym for Structured Query Language. Now the name of the language most commonly used to access relational databases. |
| 11. WHERE clause | The part of an SQL statement that defines the conditions (restrictions) for selecting data before grouping (if grouping is specified). These restrictions are referred to as search conditions. |
| 12. administrator | An individual who carries out tasks such as creating databases and/or monitoring the use and performance of those databases. |
| 13. attribute | A descriptive characteristic or property of an entity, such as name, order number, item quantity, and so on. A characteristic such as UNIQUE or NOT NULL that can be applied to a column or other entity. For example, for the entity "customer", attributes may include address, company or salary. |
| 14. column | The vertical component of a table. A column contains information about one of the attributes of an entity. The relational equivalent of a field. |
| 15. database | A collection of data that has meaning to an organization or to an individual and that is managed as a unit. |
| 16. RCP | One of the set of "r" commands introduced by the Berkeley version of UNIX that allows a user on one machine to suitably address remote machines. An account is required and that account must have initiated the request. The "rcp" command allows a user to copy one or more files to a location in another account on the same machine, to a remote machine, between two remote machines or between accounts at the same machine. |
| 17. relationship | Describes the correlation among entities or among attributes. |

DRM CLIENT COMPONENT SECTION 12-2b LISTINGS

```
a. CreateAllEvents Routine
Private Function CreateAllEvents(blnTransform As Boolean) As Integer
Dim blnFirstTime As Boolean
Dim intColumnSize As Integer
Dim intDecimals As Integer
Dim intExtractNumber As Integer
Dim intImageTop As Integer
Dim intTransformLeft As Integer
Dim intTransformTop As Integer
Dim intNullIndicator As Integer
Dim intSourceIndex As Integer
Dim intStatus As Integer
Dim intTargetIndex As Integer
Dim intTransferNumber As Integer
Dim intTransferTop As Integer
Dim intTransformIndex As Integer
Dim lngWarehouseId As Long
Dim lngSourceId As Long
Dim lngSourceTable As Long
Dim intSourceTop As Integer
Dim lngTableNumber As Long
Dim lngTargetId As Long
Dim lngTargetDbKey As Long
Dim lngTargetTable As Long
Dim lngAgentId As Long
Dim strColumnName As String
Dim strDataType As String
Dim strEventName As String
Dim strSourceName As String
Dim strSqlStatement As String
Dim strTableName As String
Dim strTargetTable As String
Dim objMySql As New TstarSQL
Dim objColumn As New TstarColumn
Dim objTargetTable As TstarTable
Dim objThisTarget As cTargetDatabase
Dim vntTargetDbKey As Variant
'if blnTransform is False, don't create Transform event
'if this is the case, then there cannot be more than
'one source or one target table. For this case, the user
'was prompted prior to this function call because one
'one source and one target table was detected.
'This function calls the repository interface
'and retrieves all the Source tables
'that relate to a particular request.
'For each table, the column definitions
'are retrieved and a Extract Event is created
'including the Sql statement. After each
'Extract event is created, the corresponding
'Transfer event is created. If Transformation
'is required one Transform event is created.
'After the Transform event, a Transfer and
'load event is created for each target table.
'Change pointer to hourglass.
Screen.MousePointer = vbHourglass
   'Test to see if all targets are on the same machine
   'If there's only one target table then all transfer
   'events point to same warehouse machine
   'If WR.TstarTargetTables.Count = 1 Then
      'Get warehouse name
      Set objTargetTable = WR.TstarTargetTables.Item(1)
      lngTargetDbKey = objTargetTable.TstarDataBase.DbKey
      'Convert database key to variant
      vntTargetDbKey = Trim(Str(lngTargetDbKey))
      'Get specific target database from collection
      Set objThisTarget = TargetDatabase.Item(vntTargetDbKey)
      'Save warehouse machine name
      mstrWarehouseMachineName =
      objThisTarget.WarehouseMachineName
      'Save warehouse database key
      mlngWarehouseDbKey = objThisTarget.WarehouseDbKey
      'Set single warehouse variable
      mblnOneWarehouseMachine = True
   Else
      'Find out if all tables are on the
      'same warehouse machine
      For Each objTargetTable In WR.TstarTargetTables
         'Get database key of target table
```

-continued

DRM CLIENT COMPONENT SECTION 12-2b LISTINGS

```
    lngTargetDbKey = objTargetTable.TstarDataBase.DbKey
    'Convert database key to variant
    vntTargetDbKey = Trim(Str(lngTargetDbKey))
    'Get specific target database from collection
    Set objThisTarget = TargetDatabase.Item(vntTargetDbKey)
    'Is this the first target table
    If mstrWarehouseMachineName = "" Then
      'yes
      mstrWarehouseMachineName =
      objThisTarget.WarehouseMachineName
    Else
      If mstrWarehouseMachineName =
      objThisTarget.WarehouseMachineName Then
        mblnOneWarehouseMachine = True
        'Save warehouse database key
        mlngWarehouseDbKey = objThisTarget.WarehouseDbKey
      Else
        mblnOneWarehouseMachine = False
        '*Change
        'Need to put up dialog box so user
        'cane select machine to transget to.
        Exit For
      End If
    End If
  Next objTargetTable
  End If
'Set return status to fail
CreateAllEvents = FAILED
'Initialize Image array indexes
intSourceIndex = 0
intTargetIndex = 0
'############Create Extract, Transfer and Transform Events #####
'Used to calculate Transfer
'and Extract event left image position
intExtractNumber = 0
intTransferNumber = 0
'Create an extract event for each sql statement
'in collection
For Each objMySql In WR.TstarSQLStatements
  'Prepare Sql buffer
  strSqlStatement = objMySql.SelectFrom &
  " " & objMySql.WhereClause
  'objMySql.DbKey points to a row in the
  'sched3_database_configs table for the source
  'database. This function returns strEventName.
  'It also returns the database key of the
  'Source Agent Server for the
  'Source database in argument lngAgentId.
  'Set starting image top position
  intImageTop = mintImageHeight
  CreateExtraEvent objMySql.DbKey, intExtractNumber,_
        strSqlStatement, "SQL Extract Event",_
        strEventName, intImageTop, lngAgentId
  'Increment extract number
  intExtractNumber = intExtractNumber + 1
Next objMySql
'Create sql objects memory
Set objMySql = Nothing
'Return the top position of the transfer or
'extract event if no transfers were generated
'Used for the transform
CreateTransferEvents "Extract", intSourceTop
'Pass top position of the transfer event
'used to calculate the Transform event
'position. It will return to new
'source top position
CreateTransformEvent intSourceTop
'Pass the top position of the transform event
'Used for the transfer events out of a transform
'This function will generate transfer and load events
CreateTransferEvents "Transform", intSourceTop
'Set return status to success
CreateAllEvents = SUCCESS
'Change pointer to normal
Screen.MousePointer = vbDefault
Exit Function
  'set lngTableNumber equal to intExtractNumber
```

-continued

DRM CLIENT COMPONENT SECTION 12-2b LISTINGS

```
  lngTableNumber = intExtractNumber
  'Get source table or group name
  strTableName = objMySql.SqlName
  'Add object to cTransformIos collection
  Request.TransformIos.Add 0, "I", lngTableNumber, strTableName
End Function
    Each of the following routines are called by routine CreateAllEvents b. CreateExtractEvent Routine
Private Sub CreateExtractEvent(lngDatabaseKey As Long, _
    intExtractNumber As Integer, strSqlStatement As String, _
    strDescription As String, strEventName As String, _
    intImageTop As Integer, lngSourceAgentDbKey As Long)
Dim strEventType As String
Dim intImageIndex As Integer
Dim intImageLeft As Integer
Dim imgNewControl As Image
Dim objNewEvent As cEvent
Dim lngSourceDatabaseId As Long
Dim intStatus As Integer
Dim lngAgentServerId As Long
Dim strDatabasename As String
Dim strDatabaseDescription As String
Dim strDataSource As String
Dim lngDatabaseType As Long
Dim strAgentName As String
Dim strAgentDescription As String
Dim strAgentHostName As String
Dim strAgentType As String
'This method creates all objects for the Extract
'Event.
'Input Values:
'(lngDatabaseKey) - Database key that points to row in
'    sched3_database_configs for Source
'    database.
'(intExtractNumber) - Number of this extract event
'    Starting at 1.
'(strSqlStatement) - Sql statement for this extract
'(strDescription) - Dummy description "SQL Extract Event"
'Output Values:
'(strEventName) - Dynamically generated event name starting
'    with the characters "SX"
'(intImageTop - The calculated top image position for this
'    Extract event.
'(lngSourceAgentDbKey) - The database key that points to a row in the
'    sched3_hosts table and a corresponding
'    row in the sched3_agent_servers table.
'Get next left and top position.
intImageLeft = intExtractNumber_
    * ((mintImageWidth) + (mintImageWidth / 8))_
    + mintImageWidth / 2
'This function returns database_name,database_description,
'datasource_name,database type,host_id,host_name,and
'server_id
intStatus = GetSourceDbAgentInfo(lngDatabaseKey, strDatabasename, _
    strDatabaseDescription, strDataSource, lngDatabaseType, _
    lngSourceAgentDbKey, strAgentName, _
    strAgentDescription, strAgentHostName, _
    strAgentType, lngAgentServerId)
'Get Out if bad status
if intStatus = SQL_ERROR Then Exit Sub
strEventType = "SX"
'The Init method creates the following Objects for this Event:
'cEvent, cDbObject, cSubEvent, and the Specific Event
'Object depending on the strEventType parameter. It also creates
'the new Event Name.
Set objNewEvent = Request.Events.Init(intImageLeft, intImageTop, _
    strEventType)
'The Configure Method saves the Source Database Key,
'the agent server id, the event description and the
'Sql Statement if Present
objNewEvent.SpecificEvent.Configure lngDatabaseKey,
lngAgentServerId, _
        strDescription, strSqlStatement
'Get created Event Name
strEventName = objNewEvent.EventName
'Save values on cSqlExtract for properties
```

DRM CLIENT COMPONENT SECTION 12-2b LISTINGS -continued

```
With objNewEvent.SpecificEvent
  .DatabaseName = strDatabasename
  .DatabaseDescription = strDatabaseDescription
  .DataSource = strDataSource
  .DatabaseType = lngDatabaseType
  .AgentDbKey = lngSourceAgentDbKey
  .AgentName = strAgentName
  .AgentDescription = strAgentDescription
  .AgentHostName = strAgentHostName
  .AgentType = strAgentType
End With
'Clear objects memory
Set objNewEvent = Nothing
'Get Image Control Array Index
intImageIndex = GetImageIndex(strEventName)
'Load new image
Load imgSqlExtract(intImageIndex)
Set imgNewControl = imgSqlExtract(intImageIndex)
'Position new image
imgNewControl.Left = intImageLeft
imgNewControl.Top = intImageTop
'Store strEventName in tag from new object
imgNewControl.Tag = strEventName
'Make control visible
imgNewControl.Visible = True
End Sub
c. CreateTransferEvents Routine
Public Sub CreateTransferEvents(strSourceType As String, _
        intSourceImageTop As Integer)
Dim lngCount As Long
Dim strSourceEvename As String
Dim lngTargetTableDbKey As Long
Dim vntTargetDbKey As Variant
Dim strExtractMachineName As String
Dim intTargetTop As Integer
Dim strEventDescription As String
Dim intTransferNumber As Integer
Dim intImageIndex As Integer
Dim intImageLeft As Integer
Dim intImageTop As Integer
Dim imgNewcontrol As Image
Dim strReleaseFiles As String
Dim strTransferType As String
Dim lngAgentServerId As Long
Dim lngSourceId As Long
Dim lngTargetId As Long
Dim intSourceIndex As Integer
Dim intSourceImageNumber As Integer
Dim intTargetIndex As Integer
Dim intTargetImageNumber As Integer
Dim strEventType As String
Dim strTargeventName As String
Dim strTargetTableName As String
Dim lngSourceTableNumber As Long
Dim lngTargetTableNumber As Long
Dim objEvent As cEvent
Dim objNewEvent As cEvent
Dim objSqlExtract As cSqlExtract
Dim objTargetTable As New TstarTable
Dim objThisTarget As cTargetDatabase
'This routine generates all transfer events coming
'from an extract or transform event.
'Input Values:
'(strSourceType) - Source types cane be either
'       "Extract" or "Transform"
'Output Values:
'(intSourceImageTop) - Top position of the Transfer event
'       or Extract event if no transfers
'       were generated and strSourceType
'       is a extract. Top position of
'       Transformevent if strSource type
'       is a transform
'Initialize source and target indexes
intSourceIndex = 0
intTargetIndex = 0
  'Clear target object from memory
  Set objThisTarget = Nothing
```

DRM CLIENT COMPONENT SECTION 12-2b LISTINGS -continued

```
'Is this a transfer after an extract
if strSourceType = "Extract" Then
  'Initialize transfer number to zero
  intTransferNumber = 0
  'Initialize image top value to zero
  intSourceImageTop = 0
  'One warehouse machine. Now test each extract
  'to see if it will occur on the same machine. For
  'each extract that's on the same machine as the
  'warehouse don't generate a transfer event.
  if mblnOneWarehouseMachine Then
   For lngcount = 1 To Request.Events.Count
     'Get extract events by finding event
     'names that begin with "SX"
     Set objEvent = Request.Events.Item(lngCount)
     strSourceEventName = objEvent.EventName
     'If non zero this is a sql extract
     If InStr(1, strSourceEventName, "SX") <> 0 Then
       'Get related sql extract object
       Set objSqlExtract = objEvent.SpecificEvent
       'Get machine name where extract will be performed
       strExtractMachineName = obj SqlExtract.AgentHostName
       if strExtractMachineName mstrWarehouseMachineName Then
         'Generate transfer event
         'Calculate new top position using
         'source extract event top position
         intSourceImageTop = objEvent.Top
         intImageTop = Int(intSourceImageTop + (mintImageHeight * 1.5))
         'Save in return argument
         intSourceImageTop = intImageTop
         'Create generic event description
         strEventDescription = "Transfer Event After Extract"
         'Set event type to file transfer
         strEventType = "F"
         'Calculate left position using Transfer number
         intImageLeft = intTransferNumber _
             * (mintImageWidth + (mintImageWidth / 8)) _
             + mintImageWidth / 2
         'The Init method creates the following Objects for this Event:
         'cEvent, cDbObject, cSubEvent, and the Specific Event
         'Object depending on the strEventType parameter.
         Set objNewEvent = Request.Events.Init(intImageLeft,
         intImageTop, _
             strEventType)
         'Set release files after transfer as default
         strReleaseFiles = "Y"
         'Default to FTP transfer
         strTransferType = "F"
         'Get agent server database key and place
         'in source id argument
         lngSourceId = objSqlExtract.AgentDbKey
         'Get Agent Server Id from sql extract event
         'and pass it to the configure method so value
         'gets stored in the cEvent Object for the
         'transfer event.
         lngAgentServerId = objEvent.AgentServerId
         'Store the Warehouse database key that was
         'acquired in the CreateAllEvents function
         lngTargetId = mlngWarehouseDbKey
         'The Configure Method for the transfer event saves
         'everything thats needed for this event type.
         objNewEvent.SpecificEvent.Configure _
             strEventDescription,
             lngSourceId, lngAgentServerId, _
             lngTargetId, strReleaseFiles, strTransferType
         'Set configured
         objNewEvent.configured = True
         'Get generated Event Name
         strTargetEventName = objNewEvent.EventName
         'Get Image Control Array Index
         intImageIndex = GetImageIndex(strTargetEventName)
         'Load new image
         Load imgFileTransfer(intImageIndex)
         Set imgNewControl = imgFileTransfer(intImageIndex)
         'Position new image
         imgNewControl.Left = intImageLeft
         imgNewControl.Top = intImageTop
```

-continued

DRM CLIENT COMPONENT SECTION 12-2b LISTINGS

```
    'Store strTargetEventName in tag from new object
    imgNewControl.Tag = strTargetEventName
    'Make control visible
    imgNewControl.Visible = True
    'Increment Child and Parent indexes
    'which are the same for the Extract and Transfer
    'and are used for the image control array.
    intTargetIndex = intTargetIndex + 1
    intSourceIndex = intSourceIndex + 1
    'These values are zero for both
    'Extract and transfer events.
    'These values are placed in the
    'sched3_complex_evt_deps table into
    'columns source_table and target_table
    lngSourceTableNumber = 0
    lngTargetTableNumber = 0
    'The LinkDependency routine calls the
    'AddDependency method of the cDependencies
    'object which adds this dependency to the
    'colDependencies collection. It also draws
    'a graphic line, and sets the image color
    LinkDependency strSourceEventName, lngSourceTableNumber, _
        strTargetEventName, lngTargetTableNumber
    'Increment transfer number
    intTransferNumber = intTransferNumber + 1
   Else
     'Don't generate transfer event.
     'We need to pass back the top
     'position of the extract event
     'Calculate new top position using
     'source extract event top position
     'unless this position was already
     'calculated by a generated transfer event.
     If intSourceImageTop = 0 Then
       intSourceImageTop = objEvent.Top
     End If
    End If
  End If
 Next lngCount
Else
  'Different warehouse machines
  'need to set not configured switch
  'in each transfer event and have user
  'select the warehouse to transfer to
  'or transfer all data to the HQ
  'Need a dialog box
 End If
Else
  'Source type must be a transform
  'If all tables are on the same machine
  'don't generate transfer events
  If mblnOneWarehouseMachine = True Then
    'Don't generate transfer events
    'but generate load events
    strSourceEventName = "T1"
    intTargetImageNumber = 0
    intSourceImageNumber = 1
    For Each objTargetTable In WR.TstarTargetTables
      lngTargetTableDbKey = objTargetTable.TstarDataBase.DbKey
      StrTargetTableName = objTargetTable.TstarDataBase.DbName
      CreateLoadEvent strSourceEventName, intSourceImageTop, _
          intSouceImageNumber, lngTargetTableDbKey, _
          intTargetImageNumber, StrTargetTableName
      intTargetImageNumber = intTargetImageNumber + 1
    Next objTargetTable
    Exit Sub
  Else
    'Different machines so we need to generate
    'transfer events out of transform
  End If
 End If
End Sub
d. CreateTransformEvent Routine
Private Sub CreateTransformEvent(intSourceTop As Integer)
Dim imgNewcontrol As Image
Dim objThisEvent As cEvent
Dim strEventDescription As String
```

-continued

DRM CLIENT COMPONENT SECTION 12-2b LISTINGS

```
Dim strEventName As String
Dim strEventType As String
Dim strSourceEventName As String
Dim StrTargetEventName As String
Dim lngCount As Integer
Dim intExtractCount As Integer
Dim intImageLeft As Integer
Dim intImageTop As Integer
Dim strDependencyStrings As String
Dim objThisDependency As cDependency
Dim lngTargetTable As Long
Dim lngSourceTable As Long
Dim intTargetIndex As Integer
Dim intSourceIndex As Integer
Dim strSourceIndex As String
Dim intExtractNameStart As Integer
Dim intExtractNameLength As Integer
Dim intTabPosition As Integer
Dim intMoveStart As Integer
Dim intMoveNumber As Integer
'This function creates the Transform event object
'intSourceTop is either the top position
'of the transfer event image or the top position
'of the extract event image if no transfers were
'required from the extract events
'Set event type to transform
strEventType = "T"
'For a Transform Target the strTargetEventName
'the target name is always "T1" and the
'traget index is always 1
strTargetEventName = "T1"
intTargetIndex = 1
'Initialize extract counter
intExtractCount = 0
For lngCount = 1 To Request.Events.Count
  'Get extract events by finding event
  'names that begin with "SX"
  Set objThisEvent = Request.Events.Item(lngCount)
  strEventName = objThisEvent.EventName
  'if non zero this is a sql extract
  if InStr(1, strEventName, "SX") <> Then
    intExtractCount = intExtractCount + 1
  End If
Next lngCount
'Clear memory
Set objThisEvent = Nothing
If intExtractCount = 1 Then
  intImageLeft = mintImageWidth / 2
Else
  intImageLeft = ((mintImageWidth * intExtractCount) _
      + ((mintImageWidth / 8) * (intExtractCount − 1)) _
      − mintImageWidth) / 2 + (mintImageWidth / 2)
End If
'The Top position is calculated using the
'argument sent to this routine.
intImageTop = Int(intSourceTop + (mintImageHeight * 1.5))
'The Init method creates the following Objects for this Event:
'cEvent, cDbObject, cSubEvent, and the Specific Event
'Object depending on the strEventType parameter.
Set objThisEvent = Request.Events.Init(intImageLeft, intImageTop, _
      strEventType)
'Save generic description
strEventDescription = "Transform Event"
'The Configure Method saves the Description
'for the Transform event
objThisEvent.SpecificEvent.Configure strEventDescription
'Set not configured
objThisEvent.configured = False
'Load new image
Load imgTransform(intTargetIndex)
Set imgNewControl = imgTransform(1)
'Position new image
imgNewControl.Left = intImageLeft
imgNewcontrol.Top = intImageTop
'Store sEventName in tag from new object
imgNewControl.Tag = "T1"
'Make control visible
```

DRM CLIENT COMPONENT SECTION 12-2b LISTINGS (continued)

```
imgNewControl.Visible = True
'Clear memory for this object
Set objThisEvent = Nothing
'At this point the cDependencies collection
'contains extract and transfer dependencies.
'For any extract event that is not in this table
'link it directly to the transform event. For all
'others, link their transfer event to the transform.
'Concatenate all source names and target names
'and append a tab at the end
strDependencyStrings = ""
For lngCount = 1 To Request.Dependencies.Count
  Set objThisDependency = Request.Dependencies.Item(lngCount)
  'Currently all dependency names relate only to
  'extract and transfers.
  strDependencyStrings = strDependencyStrings & _
        objThisDependency.SourceName & _
        objThisDependency.TargetName & vbKeyTab
Next lngCount
'Clear memory
Set objThisDependency = Nothing
'Initialize this value to zero. It is incremented
'by one for each event that comes into the
'transform event. This value is column target_table of the
'sched3_complex_evt_deps table
'lngTransformTargetTable = 0
'The lngSourceTable value is placed in
'column source_table in sched3_complex_evt_deps
'and is always zero for the transform dependencies.
'The lngTargetTable value is placed in column
'target_table and starts at zero and is
'incremented by one for each dependency coming into
'the transform event.
lngSourceTable = 0
lngTargetTable = 0
'The Image index for a transform
'is always one
intTargetIndex = 1
'Now walk all events and get each extract
'event and see if its in the table. If it
'isn't then it should get linked directly
'to the transform event. For all others their
'transfer event is linked to the transform
For lngCount = 1 To Request.Events.Count
  Set objThisEvent = Request.Events.Item(lngCount)
  'Find each extract event
  ifInStr(1, objThisEvent.EventName, "SX") <> 0 Then
    'Test to see if it is in the dependency string
    intExtractNameStart = InStr(1,
    strDependencyStrings, objThisEvent.EventName)
    If intExtractNameStart <> 0 Then
      'Found an extract transfer dependency. Get
      'intExtractNameStart is the starting poisition
      'of the extract event name which is followed
      'by the transfer event name and then a tab.
      'Get the transfer event name which is the
      'source dependency.
      'Get length of extract event name
      intExtractNameLength = Len(objThisEvent.EventName)
      'Get tab position which is after transfer event name
      intTabPosition = InStr(intExtractNameStart,
      strDependencyStrings, vbKeyTab)
      'Calculate transfer event name starting position
      intMoveStart = intExtractNameStart +
      intExtractNameLength
      'Calculate number of characters to move
      intMoveNumber = intTabPosition - intMoveStart
      'Move transfer event name into source name
      strSourceEventName = Mid(strDependencyStrings,
      intMoveStart, intMoveNumber)
      'Get the image index of the source event
      'from the event name
      strSourceIndex = Mid(strSourceEventName,
      2, Len(strSourceEventName) - 1)
      'Convert to integer
      intSourceIndex = Trim(Val(strSourceIndex))
      'Found a extract dependency. This means
      'it is linked to a transfer event. Store the
      'dependency and draw line
      LinkDependency strSourceEventName, lngSourceTable, _
            strTargetEventName, lngTargetTable
      'Increment target_table input number
      lngTargetTable = lngTargetTable + 1
    Else
      'Need to link extract directly to
      'transform event, because their is
      'no transfer event for this extract
      'Move extract event name into source name
      strSourceEventName = objThisEvent.EventName
      'Get the image index of the source event
      'from the event name
      strSourceIndex = Mid(strSourceEventName,
      3, Len(strSourceEventName) - 2)
      'Convert to integer
      intSourceIndex = Trim(Val(strSourceIndex))
      LinkDependency strSourceEventName, lngSourceTable, _
            strTargetEventName, lngTargetTable
      'Increment target_table input number
      lngTargetTable = lngTargetTable + 1
    End If
  End If
Next lngCount
'Return to transform image top position
'for the transfer events
intSourceTop = intImageTop
End Sub
e. CreateLoadEvent Routine
Private Sub CreateLoadEvent(strSourceEventName As String, _
        intSourceImageTop As Integer, _
        intSourceImageNumber As Integer, _
        lngTargetTableDbKey As Long, _
        intTargetImageNumber As Integer, _
        strTargetTableName As String)
  Dim iImageIndex As Integer
  Dim intImageLeft As Integer
  Dim intImageTop As Integer
  Dim imgNewControl As Image
  Dim objNewEvent As cEvent
  Dim strCreateOption As String
  Dim strEventDescription As String
  Dim strEventType As String
  Dim strTargetEventName As String
  Dim intSourceImageIndex As Integer
  Dim lngTargetTableNumber As Long
  Dim lngSourceTableNumber As Long
  'Calculate Top position using Transfer event
  'or transform event Parent Location
  intImageTop = Int(intSourceImageTop + (mintImageHeight * 1.5))
  'Calculate left position using Transfer number
  intImageLeft = intTargetImageNumber _
        * (mintImageWidth + (mintImageWidth / 8)) _
        + mintImageWidth / 2
  'Set event type
  strEventType = "DL"
  'The Init method creates the following Objects for this Event:
  'cEvent, cDbObject, cSubEvent, and the Specific Event
  'Object depending on the strEventType parameter. It also creates
  'the new Event Name.
  Set objNewEvent = Request.Events.Init(intImageLeft, intImageTop, _
        strEventType)
  'Get generated Event Name
  strTargetEventName = objNewEvent.EventName
  'Set dummy description
  strEventDescription = "Database Load Event"
  'Set Create option to New table
  strCreateOption = "N"
  'The Configure Method saves the Event description
  'and everything thats needed for Data Base load event.
  objNewEvent.SpecificEvent.Configure strEventDescription _
      lngTargetTableDbKey, strTargetTableName, strCreateOption
  'Get Image Control Array Index
  iImageIndex = GetImageIndex(strTargetEventName)
  'Load new image
  Load imgDbLoad(iImageIndex)
```

-continued

DRM CLIENT COMPONENT SECTION 12-2b LISTINGS

```
Set imgNewControl = imgDbLoad(iImageIndex)
'Position new image
imgNewControl.Left = intImageLeft
imgNewControl.Top = intImageTop
'Store sEventName in tag from new object
imgNewControl.Tag = strTargetEventName
'Source and target table numbers
'for a load event are always zero
lngSourceTableNumber = 0
lngTargetTableNumber = 0
'Create dependency with the Transform event
The LinkDependency routine calls the
'AddDependency method of the cDependencies
'object which adds this dependency to the
'colDependencies collection. It also draws
'a graphic line, and sets the image color
LinkDependency strSourceEventName, lngSourceTableNumber, _
      strTargetEventName, lngTargetTableNumber
'Make control visible
imgNewControl.Visible = True
End Sub
```

While in accordance with the provisions and statutes there has been illustrated and described the best form of the invention, certain changes may be made without departing from the spirit of the invention as set forth in the appended claims and that in some cases, certain features of the invention may be used to advantage without a corresponding use of other features.

What is claimed is:

1. A method for facilitating the creation of data warehouse requests for populating data warehouse tables defining a particular warehouse design in a data warehouse system comprised of a number of data source systems and a target system, a repository component for storing information representative of the warehouse design and a warehouse management interface component operatively coupled to the repository for enabling development of warehouse requests required to populate the warehouse tables, each warehouse request having a plurality of subcomponents specifying a process of extracting data from source tables of a source database located in one of the data source systems, moving the data to the target system, transforming the data to match target system requirements and then storing the data into a target database of the target system, the method comprising the steps of:

(a) during the design phase, generating and storing in the repository, information defining reference links between each target data warehouse table and the source tables from which instances must be extracted, identification of the source databases and target database, reference links between corresponding portions of the source and target tables, and identification of those warehouse request entities related to a number of target tables to be populated by a particular warehouse request;

(b) upon completion of the design phase, invoking a data replication management (DRM) component included within the warehouse management interface component in response to a selection of a warehouse request to be implemented;

(c) in response to the selection, automatically creating the different subcomponents of a data warehouse request by the DRM component accessing the previously created reference links from the repository and displaying a visual representation of the subcomponents of the request; and, (d) providing access to menus of a menu facility for enabling visualization of the automatically created data warehouse request and for making any required modifications to information related to the each of the subcomponents selected for display prior to scheduling the request for execution.

2. The method of claim 1 wherein the method further includes the step of:

(e) the DRM component being operative in response to being supplied properties pertaining to a particular subcomponent object, to signal when the subcomponent or event has been configured.

3. The method of claim 2 wherein the method further includes the steps of:

(f) in response to an indication that all events of the particular warehouse request having been configured, the DRM component is operative to activate a scheduling control button through the menu facility for enabling the scheduling of the warehouse request for execution.

4. The method of claim 1 wherein step (a) further includes providing extensions in the repository for creating and storing:

objects identifying the data source entities and source data table entities and attributes from which information is to be extracted, objects identifying each target warehouse table entity and attributes and objects identifying the warehouse request entities that are to perform the extraction; and, links between the data source and source data table objects defining the references between the data source and source table entities, links between the source data table objects and the target table objects defining the references between corresponding portions of the source data and target table entities and links between each target table object and the particular warehouse request object for identifying those target tables to be populated by the warehouse request.

5. The method of claim 4 wherein step (a) further includes:

(1) using the extensions in the repository to create a number of objects identifying applications that could be activated for providing data to be used in populating the warehouse target tables; and (2) for creating links between each application object and source table object for indicating that the source table is to be accessed by an application.

6. The method of claim 1 wherein the DRM component includes an application program interface (API) for tightly coupling the repository to the DRM component, the DRM component including a management request section operatively available through the API and wherein step (b) further includes the steps of (1) invoking the DRM component by selecting a control function provided by the graphical interface, the control function invoking the API causing the activation of the DRM management request section; and, (2) selecting the object identifying the warehouse request to be implemented.

7. The method of claim 1 wherein the DRM component includes an application program interface (API) for operatively coupling the repository to the DRM component, the DRM component including a management request section operatively available through the API and the menu facility including an action menu and a warehouse request menu, step (b) further including the steps of (1) invoking the management request section through the action menu using the menu facility; and, (2) selecting a particular warehouse request to be implemented from items contained in the warehouse request menu.

8. The method of claim 6 or 7 wherein step (c) further includes the steps of:

(1) retrieving from the repository, information defining the characteristics/attributes of the target table entity and associated source table entities and characteristics;

(2) based on the information retrieved in step (1), the DRM management section automatically constructing the sequence of subcomponents or events for implementing the warehouse request and (3) the DRM management request section causing the graphical interface to display automatically, subcomponent icon objects representing the events to be used in implementing the request in accordance with the constructed sequence.

9. The method of claim 8 wherein the DRM management section causes the display of subcomponent icon objects specifying an event sequence containing Extract, Transfer, Transform and Load icon objects.

10. The method of claim 9 wherein the event sequence of icon objects consists of a number of Extract icon objects, a number of Transfer icon objects, a Transform icon object and a number of Load icon objects as defined by information retrieved from the repository.

11. The method of claim 9 wherein the DRM management request section in response to information for a particular warehouse request defining multiple extraction operations from different data source entities causes the display of an Extract icon object for each different data source and the display of a separate Transfer icon object for each Extract icon object wherein the Extract/Transfer icon objects are displayed in parallel indicating to the administrator that work will be carried out in parallel to maximize system throughput.

12. The method of claim 11 wherein the Extract icon object is either a first or second type of Extract object.

13. The method of claim 8 wherein step (d) further includes the step of:

(1) in response to selecting a particular subcomponent icon object, the DRM management request section being operative to display through the menu facility, a menu for providing access to properties pertaining to the event associated with the selected subcomponent icon object.

14. The method of claim 13 wherein in response to selecting the first type of Extract icon object, the DRM management request section provides through the menu facility, a first menu for displaying properties pertaining to a database event that include a database programming language statement, a database name, a database type and an Event description.

15. The method of claim 14 wherein the DRM management request section through the menu facility, enables modification of properties relating to the database programming language statement and the Event description of the selected Extract icon object.

16. The method of claim 15 wherein the database programming language is SQL and the properties relate to a WHERE clause that may be appended to the SQL statement.

17. The method of claim 13 wherein the selection of the Transfer icon object provides through the menu facility, a second menu for displaying properties that include transfer type, nodes involved in the transfer, directories used for data movement and Event description.

18. The method of claim 17 wherein the DRM management request section through the menu facility, enables modification of properties including the Event description of the selected Transfer icon object.

19. The method of claim 13 wherein the warehouse system further includes a transformation client component operatively coupled to the DRM client component, the DRM management request section in response to selecting a Transform icon object operates to invoke the transformation client component and provides through the menu facility, a third menu for displaying properties that include descriptions of the mapping of individual fields provided by the transformation client component.

20. The method of claim 13 wherein in response to selecting a Load icon object, the DRM management request section provides through the menu facility, a fourth menu for displaying properties defining parameters required for loading the target tables that include target system name, database name, database type and Event description.

21. The method of claim 20 wherein the DRM management request section includes menu facilities for enabling modification of properties including the Event description of the selected Load icon object.

22. The method of claim 13 wherein in response to selecting a second type of Extract icon object, the DRM management request section provides through the menu facility, a fifth menu for displaying the properties pertaining to an application that include a path to the application and location of application output files and description files, USERID/password required to execute the application and node of the application.

23. The method of claim 7 wherein the DRM component further includes a view status section and wherein the method further includes the steps of:

(1) invoking the viewing status section through the action menu using the menu facility; and, (2) displaying status by the view status section of a particular warehouse request selected from items contained in the warehouse request menu.

24. Apparatus for facilitating the creation of data warehouse requests for populating a number of warehouse tables defining a particular warehouse design in a data warehouse system comprised of a number of data source systems and a target system, a repository component operatively coupled to a design component for storing information representative of the warehouse design, and a warehouse management interface component operatively coupled to the repository for enabling an administrator to develop warehouse requests required to populate the warehouse tables, each warehouse request having a plurality of subcomponents for implementing execution of the request to populate tables of the data warehouse tables wherein subcomponents are used in specifying a process of extracting data from source tables of a source database located in one of the data source systems, moving the data to the target system, transforming the data to match target system requirements and then storing the transformed data into a target database of the target system, the apparatus comprising:

(a) extensions added to the repository, the extensions being used during the design phase for storing in the repository, information defining reference links between each target data warehouse table and the source tables from which instances must be extracted, identification of the source databases and target database, reference links between corresponding portions of the source and target tables, and identification of those warehouse request entities related to a subset of target tables to be populated by a particular warehouse request; and (b) a data replication management (DRM) component included within the warehouse management interface, the DRM component being operatively coupled to the repository, the DRM component being operative upon being invoked upon completion of the design phase to automatically create the different subcomponents of a data warehouse request by accessing the previously created reference links from the repository and displaying a visual representation of the subcomponents of the request; and, the DRM component including a menu facility for providing access to a set of menus for enabling visualization of the automatically created data warehouse request and making any required modifications to information related to the each of the subcomponents selected for display prior to scheduling the request for execution.

25. The apparatus of claim 24 wherein the DRM component menu facility further includes:

(c) first control means operative in response to being supplied properties pertaining to a particular subcomponent object, to signal when the subcomponent object or event has been configured by the DRM component.

26. The apparatus of claim 25 wherein the DRM component further includes:

(d) a second control means operative in response to an indication that all events of the particular warehouse request having been to activate a scheduling control button of the menu facility for enabling scheduling the warehouse request for execution.

27. The apparatus of claim 24 wherein the repository extensions enable creation and storage of information pertaining to:

objects identifying the data source entities and source data table entities and attributes from which information is to be extracted, objects identifying each target warehouse table entity and attributes and objects identifying the warehouse request entities that are to perform the extraction; and, links between the data source and source data table objects defining the references between the data source and source table entities, links between the source data table objects and the target table objects defining the references between corresponding portions of the source data and target table entities and links between each target table object and the particular warehouse request object for identifying those target tables to be populated by the warehouse request.

28. The apparatus of claim 27 wherein the repository extensions enable creation and storage of information pertaining to:

(1) objects identifying applications to be activated for providing data to be used in populating the warehouse target tables; and (2) links between each application object and source table object for indicating that the source table is to be accessed by an application.

29. The apparatus of claim 24 wherein the DRM component further includes an application program interface (API) for tightly coupling the repository to the DRM component, the DRM component further includes a management request section operatively coupled to the API, the DRM component being invoked by selecting a control function provided by the repository extensions through the menu facility and, the repository extensions enabling selection of the object identifying the warehouse request to be implemented.

30. The apparatus of claim 24 wherein the DRM component further includes an application programming interface (API) operatively coupling the repository to the DRM component, the DRM component including a management request section operatively coupled to the API and wherein the menu facility further includes an action menu and a warehouse request menu, the action menu enabling the invoking of the management request section; and, the warehouse request menu enabling selection of a particular warehouse request to be implemented.

31. The apparatus of claim 29 or 30 wherein the DRM management request section upon being invoked:

retrieves from the repository, information defining the characteristics/attributes of the target table entity and associated source table entities and attributes;

automatically constructs the sequence of events for implementing the warehouse request based on the retrieved information; and through the menu facility, automatically displays subcomponent icon objects representing the events to be used in implementing the request in accordance with the constructed sequence.

32. The apparatus of claim 31 wherein the DRM management request section causes the display of subcomponent icon objects specifying an event sequence containing Extract, Transfer, Transform and Load icon objects.

33. The apparatus of claim 31 wherein the event sequence of icon objects consists of at least one Extract icon object, at least one Transfer icon object, a Transform icon object and at least one Load icon object as defined by information stored and retrieved from the extensions to the repository.

34. The apparatus of claim 30 wherein the DRM component further includes a viewing status section, the viewing status section being invoked through the action menu using the menu facility and operative to display status of a particular warehouse request selected from items contained in the warehouse request menu.

35. The apparatus of claim 32 wherein the DRM management request section in response to information for a particular warehouse request defining multiple extraction operations from different data source entities causes the display of an Extract icon object for each different data source and the display of a separate Transfer icon object for each Extract icon object wherein the Extract/Transfer icon objects are displayed in parallel indicating to the administrator that work will be carried out in parallel to maximize system throughput.

* * * * *